United States Patent
Iwamura

(10) Patent No.: US 6,272,535 B1
(45) Date of Patent: *Aug. 7, 2001

(54) SYSTEM FOR ENABLING ACCESS TO A BODY OF INFORMATION BASED ON A CREDIT VALUE, AND SYSTEM FOR ALLOCATING FEES

(75) Inventor: Keiichi Iwamura, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/791,417

(22) Filed: Jan. 30, 1997

(30) Foreign Application Priority Data

Jan. 31, 1996 (JP) .................................................. 8-016081
Jan. 31, 1996 (JP) .................................................. 8-016082

(51) Int. Cl.⁷ .............................. G06F 15/16; G06F 17/60
(52) U.S. Cl. ....................... 709/217; 709/218; 709/219; 709/200; 709/201; 705/51; 705/52; 705/26
(58) Field of Search .................................. 380/4, 24, 25; 395/200.48, 200.59, 200.79, 200.47, 701; 709/201, 200, 218, 229, 249, 217; 707/104; 705/27, 5, 26, 51, 52

(56) References Cited

U.S. PATENT DOCUMENTS

| 4,751,732 | 6/1988 | Kamitake | 380/20 |
| 4,827,508 | * | 5/1989 | Shear | 380/4 |

(List continued on next page.)

FOREIGN PATENT DOCUMENTS

| 0537756 A2 | 4/1993 | (EP) . |
| 0537756 A3 | 4/1993 | (EP) . |
| 0594493 A1 | 4/1994 | (EP) . |
| 60-72218 | 4/1985 | (JP) . |
| 60-191322 | 9/1985 | (JP) . |
| 64-68835 | 3/1989 | (JP) . |
| 244447 | 2/1990 | (JP) . |
| 464129 | 2/1992 | (JP) . |
| WO94/1825 | 1/1994 | (WO) . |

OTHER PUBLICATIONS

Mori, R. et al., "Superdistribution: The Concept and the Architecture", Transactions of The Institute of Electronics, Information and Communication Engineers of Japan, vol. E73, No. 7, Jul. 1990, pp. 1133–1146, XP002010383.

(List continued on next page.)

Primary Examiner—Kevin J. Teska
Assistant Examiner—William Thomson
(74) Attorney, Agent, or Firm—Fitzpatrick, Cella, Harper & Scinto

(57) ABSTRACT

An accounting apparatus has a money input, by which a user can input an amount of money into the apparatus. A receiver receives a body of information transmitted over a communication medium, and a register is arranged to store at least two data received with such body of information. A control unit processes the at least two data in the register received with such body of information, and the amount input by the user via the money input, and an indicator indicates to the user whether the user is permitted access to the body of information, based on a result of processing provided by the control unit.

37 Claims, 11 Drawing Sheets

U.S. PATENT DOCUMENTS

| 4,999,806 | * | 3/1991 | Chernow et al. | 395/200.49 |
| 5,103,476 | * | 4/1992 | Waite et al. | 380/4 |
| 5,138,712 | * | 8/1992 | Corbin | 395/200.59 |
| 5,247,575 | * | 9/1993 | Sprague et al. | 380/9 |
| 5,260,999 | * | 11/1993 | Wyman | 380/4 |
| 5,457,746 | * | 10/1995 | Dolphin | 380/4 |
| 5,579,222 | * | 11/1996 | Bains et al. | 705/26 |

| | | | |
|---|---|---|---|
| 5,634,012 | * 5/1997 | Stefik et al. | 705/39 |
| 5,638,443 | * 6/1997 | Stefik et al. | 380/4 |
| 5,732,395 | * 3/1998 | Silverman | 704/260 |
| 5,745,681 | * 4/1998 | Levine et al. | 709/200 |
| 5,745,754 | * 4/1998 | Lagarde et al. | 707/104 |
| 5,757,917 | * 5/1998 | Rose et al. | 380/25 |
| 5,765,152 | * 6/1998 | Erikson | 707/9 |
| 5,774,874 | * 6/1998 | Veeneman et al. | 705/27 |
| 5,819,092 | * 10/1998 | Ferguson et al. | 395/701 |
| 5,960,086 | * 9/1999 | Atalla | 380/44 |

OTHER PUBLICATIONS

R.L. Rivest, A. Shamir and I. Adelman, "A method of obtaining digital signatures and public key cryptosystems", Comm. of ACM, 1978.

H.C. Williams, "A modification of the RSA public–key encryption procedure", IEEE Trans. Inf. Theory, IT–26, 6, 1980.

A. Shamir and R.E. Zippel, "On the security of the Merkle–Hellman cryptgraphic scheme", IEEE Trans. Inf. Theory, IT–26, 3, 1980.

S. Goldwasser, S. Micali and A. Yao, "Strong signature schemes", ACM Symp. on Theory of Computing 1983.

S. Goldwasser, S. Micali and R.L. Rivest, "A paradoxical solution to the signature problem", ACM Symp. on Foundation of Computer Science, 1984.

H. Ong, C.P. Schnorr and A. Shamir, "An efficient signature scheme based on quadratic equation", ACM Symp. Theory of Computing.

* cited by examiner

SYSTEM FOR ENABLING ACCESS TO A BODY OF INFORMATION BASED ON A CREDIT VALUE, AND SYSTEM FOR ALLOCATING FEES

BACKGROUND OF THE INVENTION

1. Field of the Invention

The present invention relates to an accounting apparatus, an information receiving apparatus incorporating the accounting apparatus, and a communication system or information distribution system incorporating that accounting apparatus, and used in a multimedia network or the like, in which information is transferred, including moving-image data, other image data, voice recordings, computer programs, other recordings, and the like, and in which an account can be easily kept of applicable charges for services rendered.

2. Related Background Art

In the field of trunk communication networks, optical fiber networks have been consolidated, cable television has been used practically, and local area networks have been used. Various types of information are provided by using such communication networks. Information service industries are becoming larger, and charge tolls in accordance with the quantity and contents of the information provided. It is important for such industries to properly charge a toll for the information provided.

Protection of information (both as regards unauthorized access to information and as regards tampering with the contents of information) has not been yet perfected, and there is accordingly an issue of illegal use of information, including programs, images, and voice recordings. In order to prevent illegal use, a copy protection function is often provided, a serial number check is performed, or other prevention methods are performed. In the serial number check, a hardware serial number and a software serial number are compared with each other when each program is executed.

The copy protection function is inconvenient when a backup is to be performed, and the serial number check is inconvenient for the large-scale management of serial numbers and sales.

A concept called "super distribution" proposed by Ryouichi Mori aims at the protection of a software proprietor (hereinafter called an information provider). This concept was disclosed in Japanese Laid-Open Patent Applications Nos. 60-191322, 60-72218, 64-68835, 2-44447, 4-64129, and others. FIG. 1 illustrates the concept of "super distribution", as disclosed in Japanese Laid-Open Patent Application No. 4-64129. An information provider P supplies proprietary software PPi (or PPj) to a user terminal station 10. The user terminal station 10 includes a discrimination or judging unit 11 and a storage unit 12. The discrimination unit 11 judges whether or not the software PP is permitted to be used, by comparing a software identification number PIDi (or PIDj) with a user ID or condition. If usable, a use history of that provider information is stored in the storage unit 12.

The information provider P charges a toll for provided information (software PP) in accordance with the use history. Reference numeral 13 denotes a software service unit (SSU) including the above-described units.

The "super distribution" system is, however, associated with the following problems.

(1) In the "super distribution" system, whether a user is a subscriber to an information provider, is judged from data specific to the user such as a user ID. It is therefore necessary to prepare at least a storage unit for storing the data specific to each user. Each user first asks the information provider to issue a user ID or the like which is stored as the user specific data. Such subscriber permission procedure is cumbersome, and the management of specific data for a large number of users requires much labor.

(2) In the "super distribution" system, the storage unit 12 for storing the software use history is used for preventing illegal use of information and for managing the use state of the information provider. In accordance with the use history, the information provider asks for the user to pay a charge.

In the "super distribution" system, information is not sold but rented, which makes the use history necessary. However, with this system, the information provider knows what information has been provided to which user, and the privacy of the user is not protected.

(3) With the "super distribution" system, although the use state and charges of provided information can be correctly managed, it would be desirable also to have a charge payment apparatus and method, without which, after the information provider checks the use state of provided information, the provider is required to ask for a charge and to receive it by using another system.

(4) With the "super distribution" system, an information provider can charge a user for use of information by using specific data assigned to the provider information. But, with recently developing multimedia-networks, other information (data non-specific to the provided information), networks and terminal devices for using the provided information become very important. But, the "super distribution" system does not consider this feature.

SUMMARY OF THE INVENTION

It is an objective of the present invention to solve the above problems (1) to (4).

It is another object of the present invention to provide a novel apparatus and system for receiving accounting information from an information provider for use in protecting the rights of an information provider while also protecting the privacy of a user.

According to one aspect of the present invention in achieving the above objectives, there is provided an accounting apparatus which has a money input, by means of which a user can input an amount of money into said accounting apparatus. The apparatus also has a receiver, connectable (directly or indirectly) to a communications line or other medium to receive a body of information transmitted over the medium, and a register arranged to store at least two data received over the line with such body of information. A control unit processes the at least two data in the register received with such body of information and the amount input by the user via the money input, and an indicator indicates to the user whether the user is permitted access to the body of information, based on a result of processing provided by the control unit.

According to another aspect of the invention, there is provided an accounting apparatus comprising an information processor, and a means for judging whether a body of information is permitted to be processed by the information processor, based on a specific datum received with that body of information and relating to that body of information, a non-specific datum also received with the information, and money information which is available in the accounting apparatus.

According to another aspect of the invention, there is provided a communication system comprising an information provider, which provides a body of information together with a first datum. A service provider provides a service relating to handling of the body of information provided by the information provider, and adds a second datum which is delivered with the body of information and the first datum to a user. (The service may for example comprise maintaining and operating a network over which the information is delivered, or making available a terminal for receiving the information, or both.) A charge distributor collects and distributes charges relating to provision of the information to the user by the information provider and to the service provided by the service provider, based on the first datum and the second datum, respectively.

These and other objects, features and advantages of various aspects of the invention will be more fully understood from a consideration of the following detailed description of the preferred embodiments, taken in conjunction with the attached drawings, in which like reference characters denote like elements, throughout.

A DETAILED DESCRIPTION OF THE PREFERRED EMBODIMENTS

First Embodiment

The first embodiment of this invention will be described with reference to FIG. 2 and FIG. 3.

Figure 2:
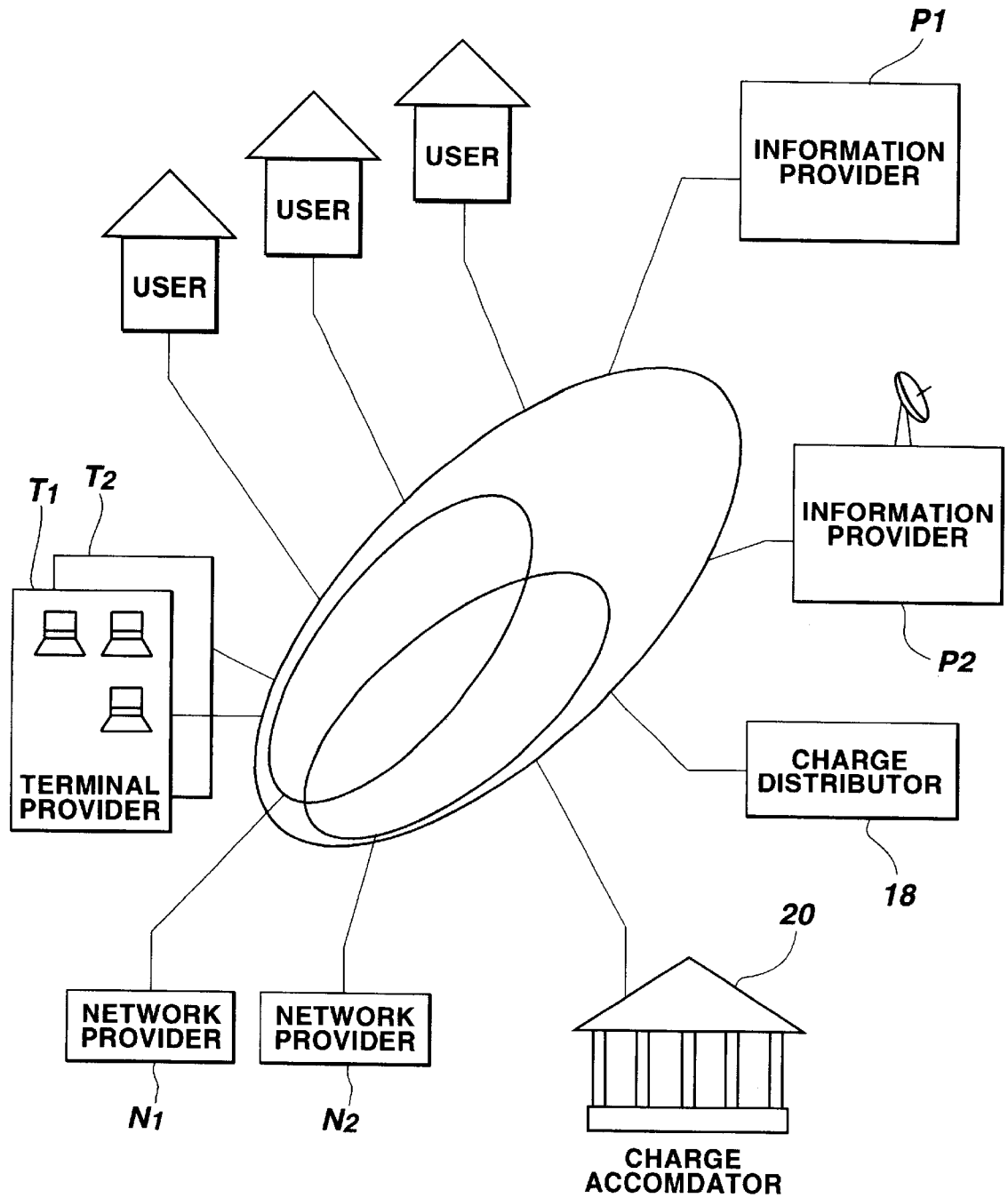
FIG. 2 is a block diagram showing an information distribution system, including an accounting system, according to this invention.

As illustrated in FIG. 2, it is expected that there will be one or more information providers P1, P2, etc., who provide information to users on request. The information may be of any kind, and might for example include films, still images, musical or voice recordings, multimedia recordings, computer software, etc. One or more network providers N1, N2, etc., will maintain networks, via which the information providers and users can communicate. One or more terminal providers T1, T2, etc., make availabe high-quality terminal devices, which users employ to send their orders for information to the information providers, and to which the information providers send the information in response to such orders. The terminals may for example, be provided in museums, stores, or indeed anywhere. While the information providers, network providers and terminal providers are indicated as being separate in FIG. 2, in practice, a single business entity may fill more than one of these functions, or all of them. A charge distributor 19, explained below, is also shown, as is a charge accommodator 20, which may for example be a bank.

In this embodiment, the charge distributor 18 serves to ensure that the money paid by the user for the services provided in the sending of requested information to him or her, are properly allocated among the parties that have respectively provided those services. That is, part of the total fee may go to the information provider who supplied the information, part to the network provider for use of the network in delivering the information, and part to the terminal provider, for use of the terminal. To this end, each of these service providers is registered with the charge distributor. The user actually pays the required fee to the charge distributor, in any suitable conventional way, such as by cash or check, by charge card, by electronic funds transfer from the user's bank 20, etc. The function of the charge distributor 18 may be filled by a retail store, such as a store where one can buy a prepaid debit card.

It should be noted that, while the term "provider" is used above to refer to the entity that supplies a given service (e.g., network service, terminal use, or filling of orders for information), the term is to be understood hereinafter as referring rather to the physical and technical means used to supply the service, and similarly for the charge distributor 18.

Thus, the illustrated system provides an accounting system which centralizes the charging and payment of fees for the information, providing simple means of payment for the user, and ensuring that each service provider receives the appropriate fee.

In the illustrated system, each terminal is provided with an accounting apparatus (see FIG. 3) which can communicate with the charge provider 18. The accounting device may of course be provided either as an integral part of the terminal or as a separate unit connected to the terminal itself electrically and, if desired, mechanically.

Figure 3:
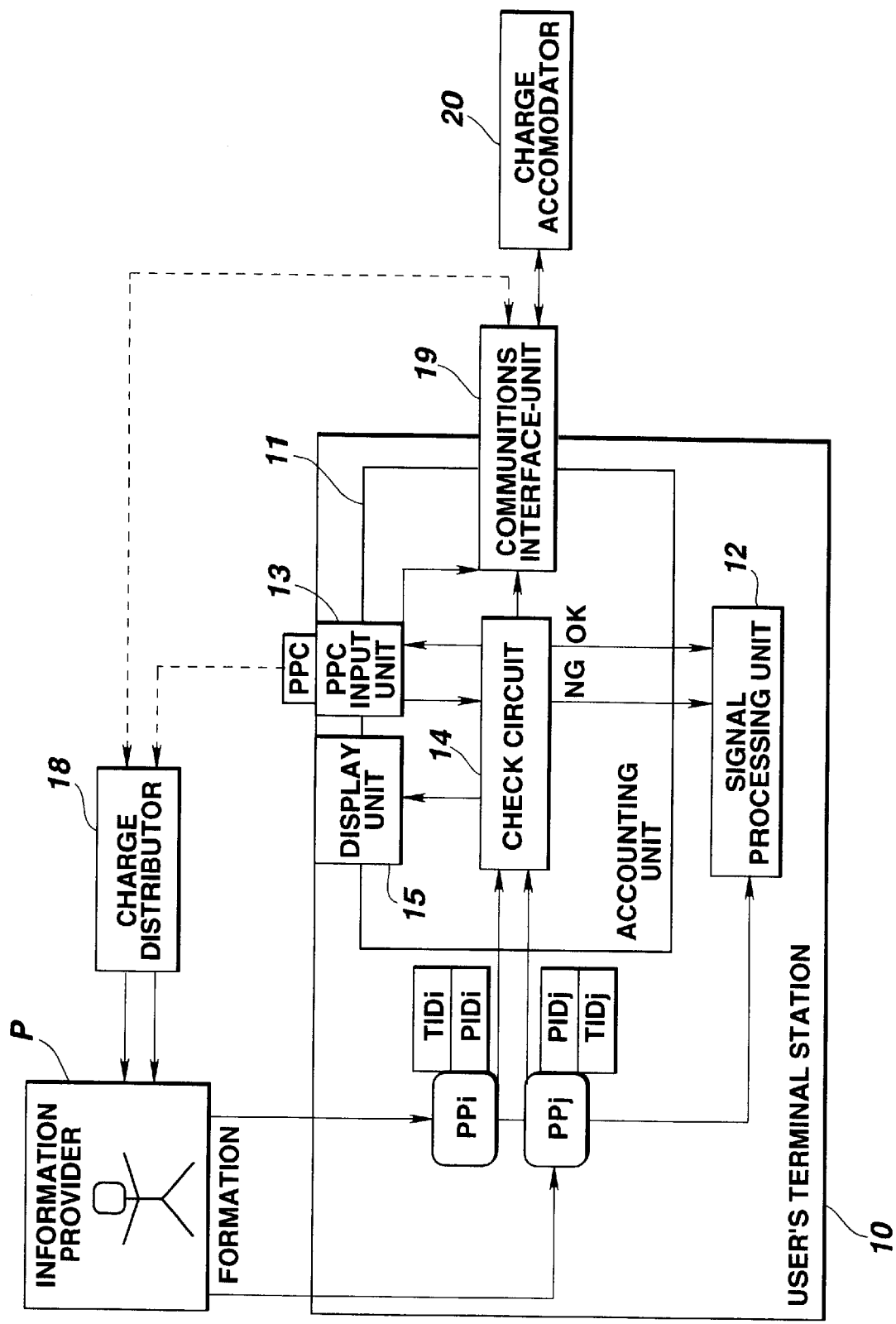
FIG. 3 is a block diagram showing an accounting apparatus and an accounting system according to the first embodiment of the invention.

In FIG. 3, information $PP_i$ and $PP_j$ are bodies of information requested from an information provider P by a user and sent by provider P to the user at a terminal 10, where each body of information is stored. As shown, each is stored with additional data $PID_i$ and $TID_i$, and $PID_j$ and $TID_j$, the origin and purpose of which is described below. (For convenience in the following discussion, the bodies of information will sometimes be referred to collectively without their subscripts, as PP, PID and TID.) An accounting apparatus or unit 11 is provided, either with or as part of the terminal 10, and has a signal processing unit 12, a money input unit 13, a check circuit 14, a display 15, and a communications interface unit 19. Via the interface unit 19 the accounting unit 11 can communicate with a bank or other charge accommodater 20, and with the charge distributor 18. The charge distributor 18, also communicates with the information provider P, as described below.

It should be noted that in this embodiment, there is no separate network provider, it being assumed that any required network is provided and operated by the information provider P. In other embodiments described below, other arrangements are shown and discussed.

To obtain a body of information PP from the information provider P, the user communicates the order to the information provider P in any conventional manner, the particular choice of which is not critical to the present invention. The information provider P sends the information $PP_i$, together with a first datum associated therewith, $PID_i$, which the informaiton provider has assigned to this particular body of information $PP_i$. In this embodiment, the datum $PID_i$ is price information, indicating the charge the information provider wishes to receive for the ordered body of information PPi. The terminal provider is the source of a second datum TIDi, which in this embodiment represents the fee the terminal provider wishes to receive.

The user inputs money via the money input 13. This may be by inserting a prepaid cash card, although it is within the scope of the invention for the money to be input in the form of currency or coins, or via a charge card, or a smart card, or some other such memory medium (e.g., a floppy diskette might be used instead of a card). The user cannot actually obtain access to the downloaded information PP until the check circuit 14 determines that access is to be permitted. For this purpose, the check circuit 14 performs a predetermined operation involving PID and TID and the money input by the user. In this embodiment, the operation is to add the data PID and TID together, to yield a total charge, and hte sum is compared to the input money value PPC. Provided the sum TID+PID is no greater than PPC, access is permitted, by the processing unit 12 performing necessary processing to reproduce the information PP for the user; in addition, the sum TID+PID is communicated to the charge distributor 18 to confirm that the information is actually being made available to the user and that the required charge has been paid. The sum TID+PID is subtracted from PPC if the latter amount represents the balance on a cash card or the like, and the remainder is entered on the cash card to indicate the value remaining in the card after the transaction. If the money input 13 is one which accepts cash and has the function of making change, then any excess of the money amount that was input by the user over the charge TID+PID can be returned to the user as change. Display unit 15 of the accounting unit 11 is used to display relevant information to the user, for example, the total charge TID+PID, and/or the balance left on the user's card after that charge is subtracted.

If the check unit 14 determines that access is not to be permitted, then the display unit 15 is used to advise the user of this fact by displaying an appropriate message.

If desired, a display device of the terminal 10 itself may be employed in place of a separate display unit 15 in the accounting apparatus 11.

Once the charge distributor 18 receives confirmation from the accounting apparatus 11 that access to the information PP is permitted to the user, and is advised as to the amount being charged for the access, then charge distributor 18 assigns part of the charge to each service provider involved in the transaction, according to a predetermined formula. (Alternatively, instead of a predetermined formula that applies to all transactions, it is within the scope of the invention for the charge distributor 18 to determine the allocation of revenue in other fashions, e.g., selecting from among several formulas that are to apply in various circumstances.)

It should be noted that the terminal 10 should be arranged so that access to information downloaded to the terminal 10 cannot be achieved without prior approval by the accounting apparatus 11.

Alternatively, the user could pay the terminal provider directly, and the terminal provider then forwards the balance (with supporting records) to the charge distributor 18. As another alternative, if the user's card is (for example) a debit card issued by a bank, the terminal provider can forward the record of the total fee charged to the charge distributor 18, which presents the charge and obtains payment from the bank 20, and distributes the charge appropriately among the various service providers.

It is to be understood also, that the user may be able to have his or her charge accommodator 20 add value to the user's card while the user is at the terminal 10. For example, if access to a body of ordered information PP is denied because too little value remains in the user's card, the user may have the charge accommodator 20 authorize the immediate addition of value to the card, thus enabling the user to obtain access to the ordered information PP after all, without the necessity of going to the bank, adding value to the card (or obtaining cash), and returning to the terminal.

Again, the terminal provider may also be a retail out-let that can issue a new prepaid cash card, so that the user can purchase a new card on the spot if necessary.

These various manners of providing payment, and of handling the actual payment, are within the ordinary skill in the art.

Use Information Notice Process

The notice process will be described assuming that the user [U], the information provider [Pr], the charge distributor [C], and the charge accommodator [D] each have a respective public key and a respective secret key capable of use as a digital signature (the technique for doing so is well known in the art). In what follows, the secret key of a party [X] is represented by [SX], and its public key by [PX].

As an example, consider now that the user [U] uses a body of information provided by [Pr]. The result produced by a party [X] using a key [Y] is represented in the following by {X}*Y, and each process by the user, the management of a key and time stamps are assumed to be made by means of having certified security provided (in a manner well known in the art) in the accounting unit 11 or by a memory or other record of the party.

(1) If user [U] wants to use the body of information in question and some network or terminal device, the accounting unit 11 permits the use of the information on the assumption that the money anmount in PPC is larger than the required charge recorded in PID and TID.

(2) After the user [U] terminates the use of information, or during such use, the accounting unit 11 subtracts the required charge (the sum of the data PID and TID contained in the register provided to store those data) from the money amount PPC.

(3) At this time, the user [U] sends the following use message MB to the charge distributor [C]. [L] is the amount to be charged the user, and TB is a time stamp.

$$MPr=[U,Pr,[Pr,L,TB]*SU]$$

(4) The charge distributor [C] inspects this message and if it is correct, an amount [L] is paid as distributed money to the information provider [Pr].

In the above description, a public key cryptosystem is used between the charge distributor [C] and each user in order to simplify the process. Obviously, a common key cryptosystem using a common key may be used instead.

The effective term of each message may be determined based on the time stamp. In the above description, the order of data elements in each message is not critical, but may be varied, as is well known to those in the art. The above accounting information input/output process and the use information notice process are only illustrative, and the use of another accounting process within the ordinary skill in the art, utilizing electronic accounting information without using data specific to the user, falls within the scope of the invention.

In this invention, the money may be input as cash, or using a pre-paid card like a telephone card, electronic accounting information stored in a floppy disk, an IC card, or a PCMCIA card. The accounting information stored in the telephone card, floppy disk, IC card, or PCMCIA card is specific data certified by a bank or other financial body.

Specifically, if the PPC is electronic money information, input/output of such electronic money information can be achieved by following communication procedure. It is assumed here that the accounting unit 11 has encryption/certification means (to be described later) and means for security management of time stamps represented by TA (to be described later). These means are provided for the certification of PPC and prevention of illegal copying or the like of PPC under the management of time stamps, because PPC may be a medium such as a floppy disk which is easy to rewrite.

Money Information Input Process (1) User [U] sends an input request message MU for money information of N Yen, dollars or the like (the money denomination used is of course not itself relevant to the invention) to the charge distributor [C], by adding registration information [iU] of the user [U] (such as an account number and credit number) and with a digital signature using the secret key [SU]:

$$MU=[U,[U,iU,N,TU]*SU]$$

TU indicates a time stamp.

(2) The charge distributor [C] inspects the digital signature of MU by using the public key [PU] of user [U], and claims payment of N to the charge accommodator [D] by using the registration information [iU].

If the payment is acknowledged, the charge distributor [C] sends the following message MC to the user [U] with a digital signature generated by using the secret key [SC] of the charge distributor [C] for each unit of money (e.g., yen, dollar, etc.) of the money information N. (If the system works using only a predetermined multiple of the local monetary unit, e.g., only in multiples of 10 yen or of 10 dollars, then the secret key is used for each such multiple unit.) Thus, each yen or other basic unit is provided with a different time stamp $TCi$.

$$MC=\Sigma[TU,[C,N,TCi]*SC]*PU$$

(3) User [U] decodes each MC by using its own secret key [SU] and inspects the digital signature by means of the public key PC of the charge distributor [C] corresponding to the secret key [SC] of the charge distributor [C]. If the inspection shows a correct signature, money information [C,N,TCi]*SC is written in PPC.

As stated, TA and TCi indicate time stamps. A message having the same stamp and same transmitter as another, is judged as an illegal request. Instead of being time stamps, TA and TCi may be a serial number or a random number (provided the system is arranged to exclude the possibility of the same number being used twice). Also, the effective term of each massage may be determined based on the time stamp.

In the above description, a public key cryptosystem is used between the charge distributor [C] and each user in order to simplify the process. Again, a common key cryptosystem using a common key may be used instead.

In the first embodiment, the accounting apparatus 11 is able to communicate with the charge distributor 18 via the interface 19 and a communications line. Instead, however, in an embodiment in which that capability does not exist, charges can be distributed in accordance with the frequency of use by collecting the use record in PPC of the provided information PP recorded by the accounting unit 11, as in the case of the message MB, when the user (here, the term refers to the individual) goes to the charge distributor to add value to the money card or the like. Provided that the electronic money information in the cards used in the system is specific data capable of being processed only by the charge distributor, then the user is required to go to the charge distributor in order to change the contents of PPC. Therefore, the use record can be collected and charges can be distributed properly.

Alternatively, the accounting unit 11 may be provided with means for recording a use of provided information PP in the pre-paid card. In this case, the charge distributor 18 collects the pre-paid cards and distributes charges in accordance with the frequency of use. In order to promote collection of pre-paid cards, the following system may be incorporated. Namely, if a new pre-paid card is bought to replace the old pre-paid card, only the money recorded in the new pre-paid card is paid, whereas if a new pre-paid card is not bought, a charge only for pre-paid card itself is paid. Charges used by pre-paid cards not collected may be distributed in accordance with ratios of charges used by pre-paid cards already collected.

Each of above processes can be applied to each of the other embodiments.

In this aspect of the invention, thus, instead of utilizing a user ID specific to the user, money information PPC not specific to the user is utilized, in order to judge whether or not the provided information PP is permitted to be used. Therefore, a user need not have a user ID. Only the money information PPC is given, i.e., only a use charge for the provided information is paid. This procedure is natural and easy. It is not necessary to manage a large amount of user specific information, and thus problem (1) can be solved.

Figure 1:
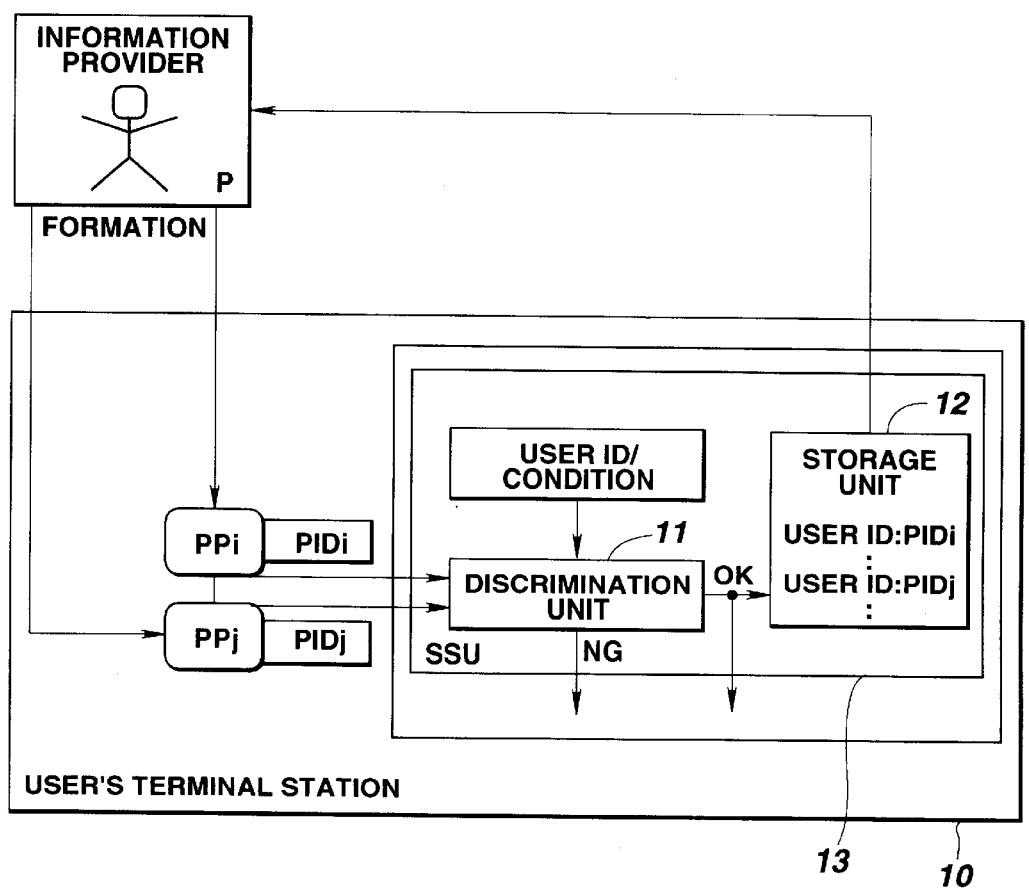
FIG. 1 is a block diagram showing a conventional "super distribution" system.

Also, since user-specific data is not given, the information provider does not learn which bodies of information have been used by which users, thus protecting the privacy of individual users, while ensuring that the charge corresponding to the frequency of use is paid to the information provider P. Although the preferred embodiment just described does not employ a use history storage unit for storing information about which body of information PP is used by a particular user, the invention may nonetheless also be provided with a frequency-of-use storage unit for keeping a record as to which information is used at what time, and a user notice unit for indicating a current use of provided information to the information provider P. In FIG. 1, frequency of use is communicated to the information provider P via the path indicated by a broken line. Even so, the information provider does not learn which user is using which body of information. Thus, the problem (2) of user privacy is also solved.

Plainly, also, since the appropriate charge is deducted from PPC and forwarded to the charge distributor, which then allocates the money among the various service providers appropriately, problem (3) also is solved.

Particular examples of how the PPC can be obtained or collected, and how charges are distributed to each information provider, while simultaneously achieving a solution of problem (2), will be described below with regard to the second to sixth preferred embodiments.

In the first embodiment, problem (4) is solved by adding a datum TID relating to use of a network and terminal, which is settled between the information provider and the network provider and/or terminal provider appropriately, such that the money received by the charge distributor is then allocated according to the agreement between the information provider and the other service provider(s).

Thus, in the present embodiment, not only the information provider but also a network provider and terminal provider will rightly receive money based on using the network by including in ITD not only the charge for the service but a record of (for example) the time of use of the network in transmitting the ordered information. In such case, of course, the accounting apparatus 11 does not simply add TID and PID to obtain the total charge, as described above, but first ascertains the network charge from TID and adds that charge to PID, and then proceeds as described above.

Also, detailed accounting can be achieved by recording using time, the kind of network used, etc. In this case, the detailed data will be recorded on a connecter device located between the network and the information provider, such as a hub device or a gateway device.

Similarly, the terminal provider, if separate from the information provider or network provider, will rightly receive money based on use of the terminal device, e.g., by adding to the incoming TID, a separate charge for its service. Alternatively, a separate charge may be attached, as an additional datum (not shown) that is also received in the register and processed with PID and TID. In general, thus, charges imposed by any number and kinds of service providers may be included, permitting great flexibility in the services provided to users.

The Second Embodiment

In this embodiment, the present invention is applied to realize an accounting unit used in a charge system suitable for use where the requested body of information PP is hierarchically encoded (a known system of encoding, described briefly below), and is sent by the information provider P with a number of layers of encoding that may vary from case to case. Using the second embodiment, the charge can be set in correspondance to the number of layers of encoding (and thus, the resolution of the received information) used in transmitting the particular body of information requested by the user. IN such a system, the user may be able to choose the number of layers to be used, based on desired resolution, or on the resolution of which the user's monitor is capable, or based on how long the user is willing to wait for the information to be transmitted. Again, it is within the scope of the invention that the number of layers might in some situations be determined at the information provider's end.

First, hierarchical encoding will be briefly described.

Hierarchical encoding is known as an encoding method which can efficiently cope with image processing apparatuses with different resolutions upon encoding image information, and is suitable for retrieving desired images from an image database.

In the following description, a reduced image that roughly represents the overall image is encoded, and subsequently, additional information (the various "layers"), each containing more detail, and used for enlarging the reduced image, in turn, is encoded.

As a result, scalable encoding using different resolutions can be realized to some extent. For example, a reduced image with a small number of pixels may be displayed on a monitor, and a detailed image with a large number of pixels using full information may be printed.

Figure 4:
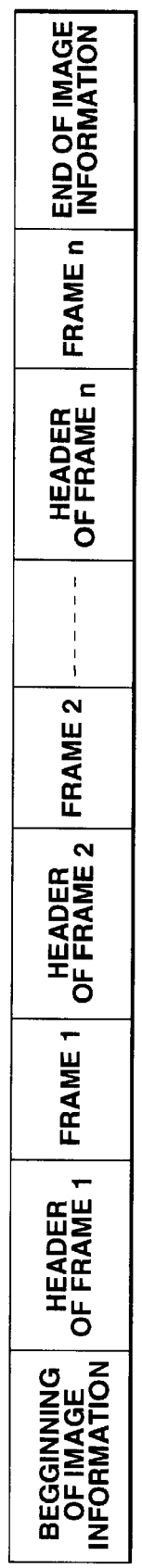
FIG. 4 is a data structure of hierarchically encoded data.

FIG. 4 shows the general data structure of hierarchically encoded data. Referring to FIG. 4, a field [header of image] includes a header indicating the beginning of a body of image information as a whole. A field [header of frame 1] includes a bit pattern indicating the beginning of frame 1, and a field [frame 1] includes information about layer 1, obtained by encoding an image obtained by reducing the original image to the smallest size used in the particular hierarchial encoding scheme in question.

A field [header of frame 2] includes a bit pattern indicating the beginning of frame 2, and a field [frame 2] includes the information of layer 2, which is difference information that can be used to enlarge the image of layer 1 or to increase its resolution.

Similarly, a field [header of frame n] includes a bit pattern indicating the beginning of frame n, and a field [frame n] includes information of layer n as difference information that can be used to enlarge or to increase the resolution of the image of layer n−1.

As a typical encoding method of this type, a JPEG hierarchical encoding method is used. For more detail on the JPEG system, reference may be made to the publications ISO/IEC 10918-1 or ITU-T T81, T.83, and which are incorporated herein by reference. Other such systems, however, may also be used within the scope of the invention.

In this embodiment, the above resolution of the hierarchical encoding method (e.g., number of layers used) is used as TID. This resolution is not specific to the particular body of image data PP ordered by the user. That is, the resolution of transmitted data is changed based on the traffic of communication line, the capability of the user's monitor or the precise capability for data search. Therefore, in this embodiment, the resolution of image data and the charge corresponding thereto are represented as TID. For example, a charge for a rough resolution of an image (call it "class 1") differs from a charge for the highest definition resolution of the same image (class n).

If it wishes, the information provider may in every case send the highest resolution image data, the user only obtaining access to the level of resolution that has been ordered and is encoded in TID; altervatively, of course, the information PP may actually be transmitted with only the number of layers that are needed by the user who ordered the information.

Figure 5:
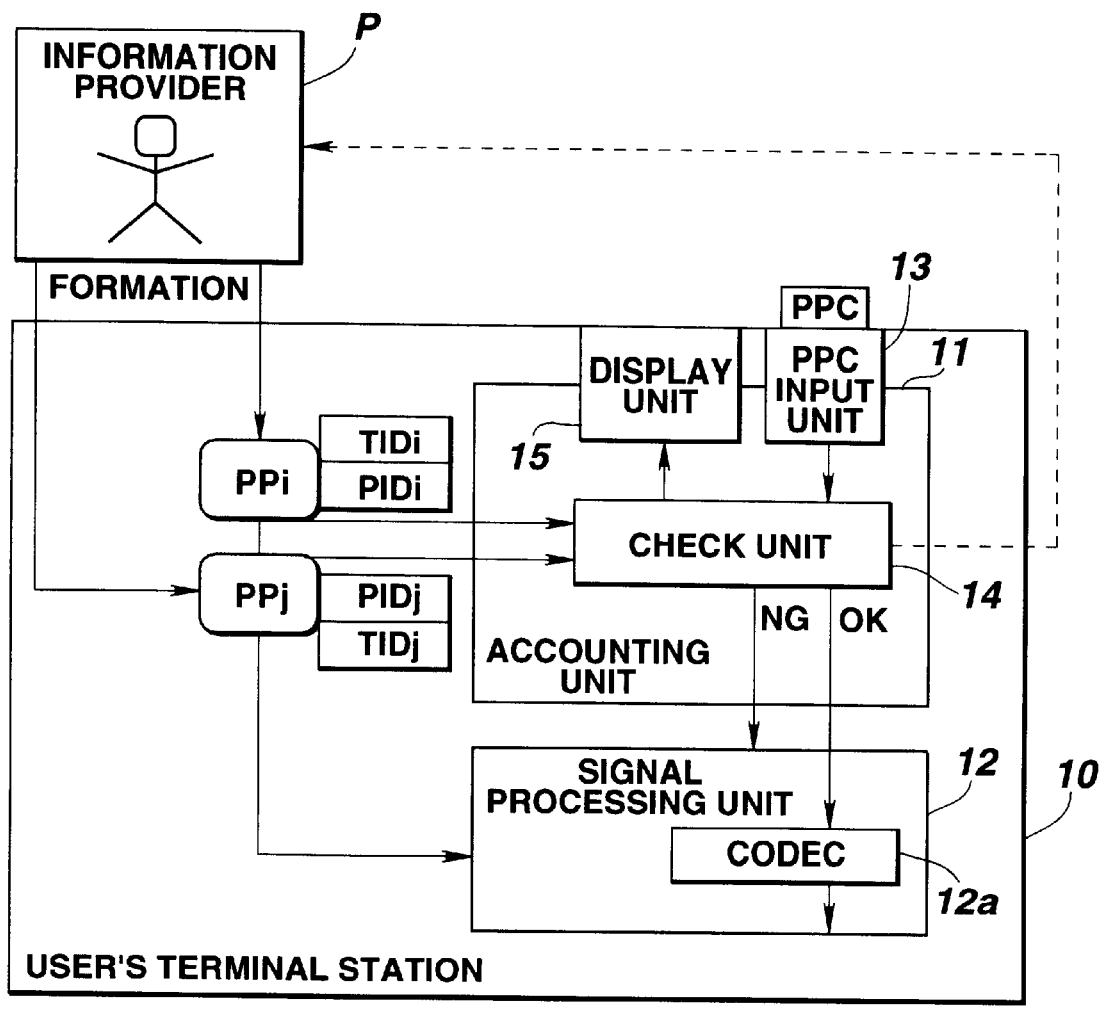
FIG. 5 is a block diagram showing an accounting apparatus and an accounting system according to the second embodiment of the invention.

In this embodiment, shown in FIG. 5, the operation is substantially the same as in the first embodiment, and need not be described again in detail. Since TID includes more information than just charge information, the check circuit 14 must derive the charge information contained in the datum TID, before adding that value to PID to obtain the total charge.

When a use of PPC is permitted by the checking (or discrimination) unit 14, resolution data recorded as all or part of TID with information PP, is sent to the codec 12a in processing circuit 12. The codec 12a then decodes the information PP based on the resolution data.

If the information PP includes all-class information (the highest definition information) and the user or the terminal device, such as the monitor, designates the resolution, the codec decodes the information PP in accordance with the designated resolution.

Also, in this embodiment, the discrimination unit 14 and the money input 13 are structured so that, even if the remaining value in the PPC can change with time, as long as the charge is smaller than the money recorded in the pre-paid card, PP can be used continuously. If the money input 13 is structured so as to allow an additional pre-paid card to be inserted, PP can be used for a longer time period.

Such a pre-paid card can be easily bought from any one of the pre-paid card retail shops, such as in the case of telephone cards. In this case, the manufacturer of the pre-paid card may serve as a charge distributer 18.

It should be noted that in FIG. 5, the charge distributor 18 and charge accommodator 20 are not shown. It is within the scope of the invention, however, for the accounting apparatus 11 of any embodiment to be connected to either or both via a communications line and an interface as in FIG. 3.

Distribution of a charge corresponding to the frequency of use is realized by the accounting unit 11 notifying the charge distributer 18 of current use information via a communications interface like the interface 19 shown in FIG. 3. This use notice is issued only when the accounting unit 11 updates the money recorded in the pre-paid card.

If the provided information PP is received via the communication line, the communication I/F 19 can be used not only for the information PP but also for the current use information.

If no communications interface is used, a pre-paid card different for each body of provided information may be used. In this case, the discrimination circuit 14 checks each pre-paid card and judges whether or not the provided information PP can be permitted to be used.

In this embodiment, software for decoding the information PP may be supplied to the user with the information PP by the information provider, network provider, or software developer. In this case, the charge collected from the user is distributed to the information provider, network provider, and software developer in accordance with the notice about use of user.

Also, the network provider may supply a decoding service for a user by decoding the information PP. In this case, the network provider adds the TID to the information PP and sends the TID to the user with decoded information in the transmitter such as a hub device.

Also, some institutes, such as an information providing center, may provide the information PP. In this case, the institute decodes the information PP according to the class of coding designated by the user and adds the TID to the decoded information PP.

The Third Embodiment

The third embodiment, which deals with compressed moving image data, will be described with reference to FIG. 6 and FIG. 7.

First, the MPEG system, which is well known as a moving image data compression method, will be briefly described.

The MPEG data conforms with the international standard for encoding a moving image in a highly efficient manner. Fundamentally, although the frequency characteristics of the data and the human visual sense characteristics are used in a manner similar to the foregoing JPEG system, the MPEG data achieves an even higher efficiency encoding by further using a redundancy in the time-base direction that is peculiar to moving images.

The MPEG system has a version MPEG1, in which the transfer rate is set to the maximum value of 1.5 Mbps for a digital stage media; and another, MPEG2, in which the upper limit on the transmission rate is eliminated altogether. It is intended that that system be usable in all of transmitting systems such as bidirectional digital multimedia equipment, digital VTR, ATV, optical fiber networks, and the like. However, since their fundamental algorithms are almost the same, the MPEG1 is used as a base, and its data structure and encoding/decoding algorithm will now be described.

In the MPEG2 system, although several encoding methods are provided, and are identified by sets of characteristics called "profiles" (simple profile, main profile, scalable profile, space scalable profile, and high profile, all of which are well known in the art), the typical, main profile is fundamentally almost the same as the MPEG1.

The principle of high efficiency encoding using the MPEG system will now be described.

In this high efficiency encoding system, by obtaining a difference between two frames (or two fields), a redundancy in the time-base direction is eliminated; the differential data thus obtained is DCT converted and variable-length encoded; and, redundancy in the space direction is eliminated, thereby realizing a high efficiency in encoding as a whole.

With respect to the redundancy in the time-base direction, in the case of a moving image, by taking advantage of high correlation between consecutive frames, a difference between the target frame (the one being encoded) and the frame that precedes or immediately follows it in time is obtained, thereby enabling the redundancy to be eliminated.

Figure 6:
FIG. 6 is a data structure of data encoded according to the MPEG method.
Figure 7:
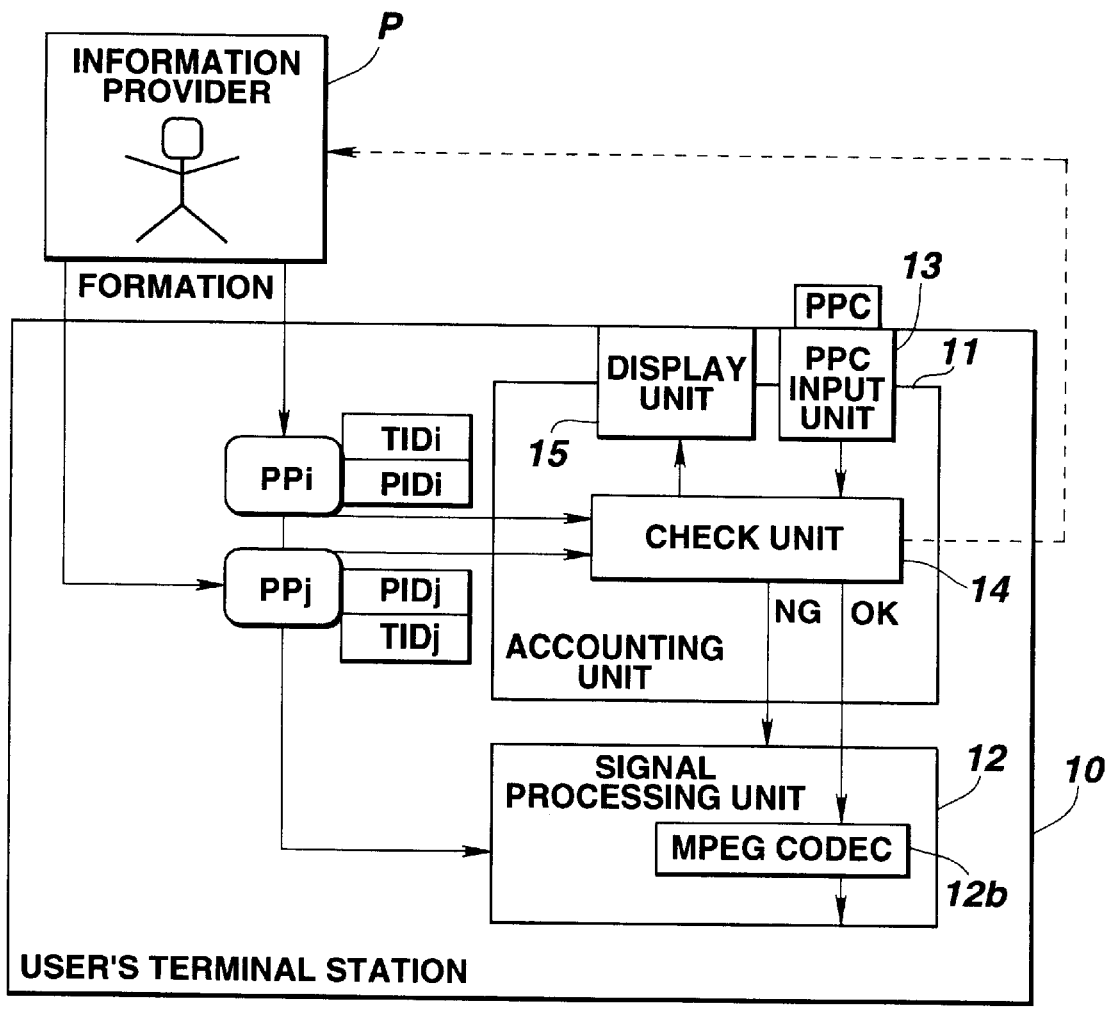
FIG. 7 is a block diagram showing an accounting apparatus and an accounting system according to the third embodiment of the invention.

In the MPEG system, therefore, in addition to an intra-frame encoding image (I-picture) which mainly encodes information in the frame with reference to other information in the frame, there are, as shown in FIG. 6: a forward prediction encoding image (P-picture) for encoding a difference value between the target frame and the preceding frame; and a two-directional prediction encoding image (B-picture) for encoding a difference value of the smallest data amount in a difference value between the target frame and the frame interpolated from both the preceding and the subsequent frames. Those frames according to those coding modes are combined in accordance with a predetermined order, as shown in FIG. 6.

In the MPEG, one unit (termed a "GOP") is constructed by one I-picture, four P-pictures, and ten B-pictures, preferably in the order shown in FIG. 6. A combination such that the I-picture is arranged at the head and two B-picture and two P-pictures are repetitively arranged, is recommended. By placing the I-pictures at a predetermined period, a special reproduction such as a reverse reproduction or a partial reproduction on a GOP-unit basis can be performed, thereby preventing errors.

When a new object appears in the frame, then by obtaining the difference between the target frame and the nexst frame, rather than by obtaining the difference between the target frame and the preceding frame, the difference value decreases, thus reducing the amount of information that has to be encoded.

In the MPEG, therefore, when executing the two-directional prediction encoding as mentioned above, a higher efficiency compression is achieved.

In the MPEG system, a motion compensation is also performed. For example, the foregoing encoding is performed on blocks of 8 pixels×8 pixels, and a larger unit (a macroblock) is constructed of four blocks with respect to luminance data and two blocks with regard to color difference data. A difference between the block being encoded and the corresponding block of the preceding or subsequent frame is obtained. By searching the macroblock for the smallest difference, a motion vector is detected. The motion vector is encoded as data.

When decoding, the corresponding macroblock data of the preceding or subsequent frame is extracted by using the motion vector, thereby decoding the encoding data which was encoded by using motion compensation.

In such a motion compensation as mentioned above, after the preceding frame has been encoded, it is again decoded, thereby obtaining a frame. The motion compensation is performed using the macroblock in such preceding frame and the macroblock of the target frame to be encoded.

Although inter-frame motion compensation is performed in MPEG1, an inter-field motion compensation is executed in MPEG2.

The different data and motion vector obtained by the motion compensation as mentioned above are further high-efficiency encoded by the DCT conversion and Huffman encoding.

The data structure of the MPEG system will now be described. The data structure is constructed by a hierarchical structure comprising a video sequence layer, a GOP layer, a picture layer, a slice layer, a macroblock layer, and a block layer. Each layer will be sequentially described from the lowest layer in the diagram.

First, the block layer is constructed by (8 pixels×8 pixels) each of luminance data and color difference data in a manner similar to the foregoing MPEG. The DCT is executed on this unit basis.

The macroblock layer is constructed by collecting four blocks with respect to each of the color difference data as for the foregoing blocks and by adding a macroblock header. In the MPEG system, the macroblock is used as a unit for motion compensation and encoding which will be explained hereinafter.

The macroblock header includes data of the motion compensation of each macroblock unit and quantization steps; and, data indicating whether six DCT blocks (luminance blocks Y0, Y1, Y2, Y3, and color difference blocks Cr, Cb) in each macroblock do or do not have data.

The slice layer is constructed by one or more macroblocks which are continuous (i.e., of more or less uniform content, like a uniform portion of background) in accordance with the scanning order of the image and a slice header. As will be understood by those in the image compresssion art, the quantization steps in a series of macroblocks in same slice layer are set to constant steps. If the slice header has data which does not exist in each macroblock, the quantization steps in the slice layer are set to constant steps. In the first macroblock, the difference value of the DC component is reset.

The picture layer is formed by collecting a plurality of slice layers on a frame unit basis and is constructed by a header, comprising a picture start code and the like, and one or a plurality of slice layers subsequent to the header.

The header includes a code indicative of an encoding mode of the image and a code indicative of a precise motion detection (pixel unit or half-pixel unit).

The GOP layer is constructed by a header such as a group start code, a time code indicative of the time from the beginning of a sequence, and the like, and a plurality of I-frame, B-frames, or P-frames subsequent to the header.

The video sequence layer starts from a sequence start code and ends at a sequence end code. Control data, such as image size aspect ratio and the like, which are necessary for decoding, and a plurality of GOPs in which the image size and the like are equal, are arranged between the sequence start code and the sequence end code.

In the MPEG system having such a data structure, a bit stream is specified by its standard.

Just as a hierarchically-encoded image may be transmitted and used with several different resolutions or in several different sizes by transmitting all layers of the data for that image, or fewer than all layers, similarly, with MPEG, a usable image can be transmitted using less than all the available image information, thus resulting in a less-detailed picture, but achieving faster transmission. In this embodiment, it is contemplated that the information provider P will not always have to send all available information in the ordered body of information PP. For example, if the user wishes a faster transmission, or has only a limited display resolution available, the the information PP may be transmitted with only the I-frames, or with the I- and P-frames but not the B-frames. Accordingly, in this embodiment, an indication of which types of pictures (I only, I and P, or I, P and B) being included, serves as TID, either by itself or together with an explicit indication of the charge for the transmission service. It will be appreciated that information which represents the kind(s) of picture transmitted, is not specific to the particular image PP, because the kind(s) of picture sent, is changed based on the traffic on the communication line, the capability of the user's monitor or other considerations, as mentioned above.

Therefore, in this embodiment, the kind(s) of pictures are represented as TID. For example, a charge for image data consisting entirely of I-pictures will differ from that for image data consisting of I-, P- and B-pictures (full frame data). The checking circuit 14 is of course constructed to derive the charge from the datum TID.

As with the second embodiment, it is contemplated either that the informaiton provider will transmit only data of the resolution that is requested, or that it will in at least some circumstances transmit full frame data, and leave it to the receiving terminal 10 to extract only what is needed or was requested.

The operation of this embodiment will be described next with reference to FIG. 7. In most respects, this embodiment operates the same as the preceding embodiments, and will only be described with respect to the differences.

When the use of PPC is permitted by the discrimination unit 14, the resolution data provided as datum TID with information PP is sent to the MPEG codec 12b, which is part of the processor 12. The codec 12b decodes the information PP based on the picture-kind data provided as TID.

If the information PP includes the full frame data and the user or the terminal device (e.g., the monitor) designates the kind(s) of picture actually to be utilized, the codec 12b decodes the information PP in accordance with the designated kind(s) of picture.

As in the second embodiment, software for decoding the information PP may be supplied to the user with the information PP by the information provider, network provider, or software developer. In this case, again, the charge collected from the user may include a charge for this additional service, which is distributed appropriately by the charge distributor 18.

Alternatively, the network provider may supply a decoding service for user by decoding the information PP in a hub device or the like. In this case, the network provider adds the datum TID and sends the TID to the user with the decoded ordered information PP.

The Fourth Embodiment

The fourth embodiment, which deals with encrypted data, will be described with reference to FIG. 8 and FIG. 9.

Several kinds of data are transmitted in multimedia-networks, and these kinds of data differ from each other in the required processing time for encryption or other processing, such as data compression with the required security (strength). For example, some data of large volume, provided in real time (such as moving image data), requires high-speed processing. On the other hand, other data, of small volume and not provided in real time (such as text data) requires high security rank rather than high-speed processing.

Also, each information provider uses its own encryption method, etc.

Therefore, this embodiment is designed to provide a new accounting system corresponding to variable security ranks based on the strength of encryption or control of access to data, and processing time based on the kind of encryption method, key data length used in the encryption, number of encryption operations, or the kind of processing, such as MPEG.

Figure 8:
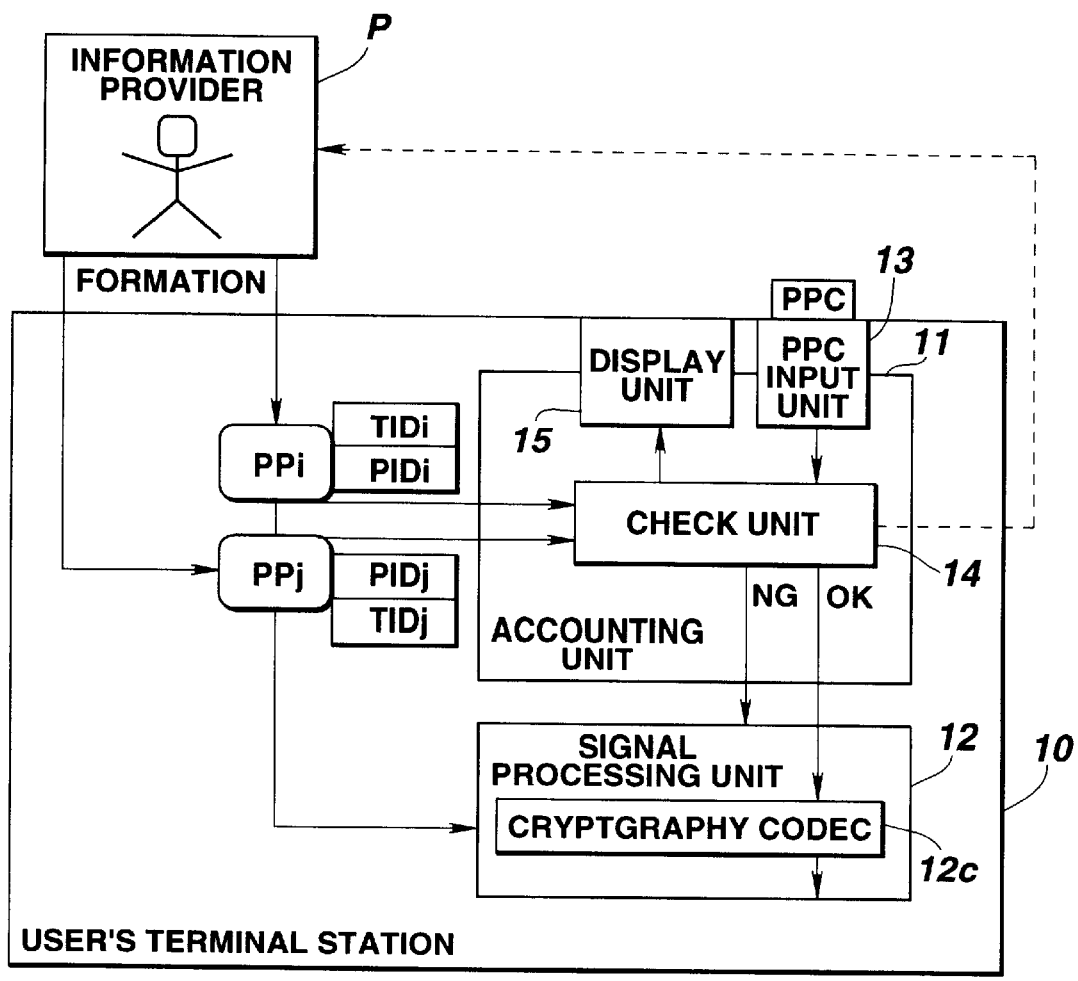
FIG. 8 is a block diagram showing an accounting apparatus and an accounting system according to the fourth embodiment of the invention.
Figure 9:
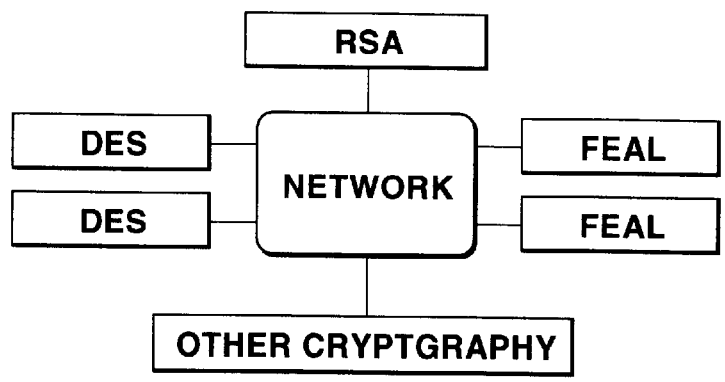
FIG. 9 is a block diagram further illustrating the accounting system according to the fourth embodiment of the invention.

In this embodiment, shown in FIG. 8, security data regarding the above encryption method and security rank, etc. and processing time are used as TID. As in the other embodiments, this datum TID is sent to the user with the requested information PP.

As this embodiment, shown in FIG. 8, again operates similarly to the ones described above, it will be described only as to differences. In this embodiment, the processor 12 has a codec 12c which is to decipher received envrypted data.

In this embodiment, the user in ordering the desired informaiton PP specifies the level of encryption to be used, or selects from among several offered combinations of security strength and processing speed, or the like. More specifically, in this embodiment, the checking unit 14 initially determines that the user's PPC is sufficient to pay for the requested information PP (if such is the case), and then the user is shown a list of the available encryption services, with the charge for each. This is preferably done by the information provider sending the various possible TID's to the terminal 10, where they are displayed to the user. The user selects one of the services, and if the PPC is sufficient to pay for the selected service as well as for the informatoin PP itself, the information provider downloads the encrypted information PP. The datum TID is used by codec 12c to decipher the information PP.

Again, it is within the scope of the invention that the information provider selects the encryption method to be used, based on available information regarding the types of encryption which the ordering user has available at his or her terminal, and attaches the proper TID accordingly, without necessarily displaying other types to the user before sending the ordered information. IN this case, the operation of this embodiment is more similar to that of the embodiments described above. FIG. 9 illustrates a situation in which a network may deliver information encrypted using any of a number of methods, including (purely by way of example), the DES method, FELA, and RSA method, all of which are well known in the art.

As further background, the secret key cryptosystem and public key cryptosystem will be described.

The secret key cryptosystem is a cryptosystem (also called a secret key cryptosystem, a symmetry cryptosystem, or a common use cryptosystem) in which a transmitter and a receiver share the same secret key. Secret key cryptosystems may be classified into block ciphers and stream ciphers, the former encrypting a fixed-length character string (block) with the same key and the latter encrypting each character string or bit with a different key. Examples of block ciphers include a replacement-cipher, which changes the order of characters, and a character-change cipher, which changes a character to a different character. In these cases, a correspondence table of replacement and character change is used as the encryption key.

Known stream ciphers include the Vigenere cipher, using a multi-table, and the Vernam cipher, using a one-time disposed key (the details of each cipher are described in Ikeno and Koyama, "Modern Cipher Theory", IEICE, 1986, second and fourth paragraphs). Of the block ciphers, DES (Data Encryption Standard) and FELA (Fast Data Encipherment Algorithm) are widely used as commercial ciphers because their algorithms are made public (for details, refer to Tsujii and Kasahara, "Cipher and Information Security", Shoukoudo, 1990, second paragraph).

Since the algorithms of DES and FELA are public, they are modified in various ways in use, in order to prevent breaking of the ciphers. For example, the number of repetitions to be described later is increased (refer to C. H. Mayer and S. M. Matyas, "Cryptography—A New Dimension in Computer Data Security", Wiley Interscience, Appendix D, pp. 679 to 712, 1982) and a key is changed frequently (refer to Yamamoto, Iwamura, Matsumoto, and Imai, "Square Type Quasi Random Number Generator and Practical Ciphering with Block Cipher", Technical Report, IEICE, ISEC93-29, pp. 65 to 75, 1993).

Public Key Cryptosystem

In the public key cryptosystem, an encipher key and a decipher key are different, the former being made public and the latter being maintained in secret. There follow: (a) features, (b) protocol, and (c) typical examples.

(a) Features of Public Key Cipher
  (1) Since the encipher key and decipher key are different and the encipher key is made public, it is not necessary to send the encipher key in secret, which facilitates a dispatch.

(2) The encipher key of each user is made public so that each user is required only to keep its decipher key in secret.

(3) A certification function can be achieved by which a receiver can confirm that a received communication text is not forged or modified.

(b) Protocol of Public Key Cipher

The algorithm of a public key satisfies the following two conditions, wherein a communication sentence is represented by M, the enciphering with the public encipher key "kp" is represented by E (kp, M), and the deciphering with a secret decipher key "ks" is represented by D (ks, M).

(1) When "kp" is given, calculation of E (kp, M ) is easy. When "ks" is given, calculation of D (ks, M) is easy.

(2) If "ks" is unknown, it is difficult to determine M from the viewpoint of the amount of calculation required, even if "kp", the calculation procedure of E, and C=E (kp, M ) are known.

If the following condition (3) in addition to the conditions (1) and (2) is satisfied, secret communications can be realized.

(3) For all communication texts (plain texts) M, it is possible to define E (kp, M) and the condition of D (ks, E (kp, M))=M is satisfied. Namely, since "kp" is made public, anyone can calculate E (kp, M). However, only a person having the secret key "ks" can obtain M by calculating D (ks, E (kp, M)). If the following condition (4) in addition to the conditions (1) and (2) is satisfied, certification communications can be realized:

(4) For all communication texts (plain texts) M, it is possible to define D (ks, M) and the condition of E (kp, D (ks, M))=M is satisfied. Namely, only a person having the secret key "ks" can calculate D (ks, M). Even if another person calculates D (ks', M) by using a forged secret key ks', the receiver can confirm that the information was forged because E (kp, D (ks', M)) becomes different from M. Even if D (ks, M) is forged, E (kp, D (ks, M)') becomes different from M and the receiver can confirm that the received information was forged.

In the public key cryptosystem, the process E using the public key is called encryption, and the process D using the secret key is called deciphering. For the secret communications, the transmitter performs encryption, and then the receiver performs deciphering. For the certification communications, the transmitter performs deciphering, and then the receiver performs encryption.

The protocols will be explained wherein a transmitter "A" uses a public key cipher and performs secret communications, certification communications, secret communications with signature, relative to the receiver "B". The secret key of "A" is represented by "ksA" and the public key of "A" is represented by "kpA", whereas the secret key of "B" is represented by "ksB" and the public key of "B" is represented by "kpB".

Secret communications of a communication text (plain text) from "A" to "B" is performed by the following procedure.

Step 1: "A" enciphers M by using the public key "kpB" of "B" and sends the enciphered text C to "B".

C=E (kpB, M)

Step 2: "B" deciphers C by using the secret key "ksB" of "B" to obtain the original plain text M.

H=D (ksB, C)

Since the public key of the receiver "B" is made public, any person not limited to "A" can have secret communications with "B".

Certification communications of a communication text (plain text) from "A" to "B" is performed by the following procedure.

Step 1: "A" generates a transmission text S by using the secret key "ksA" of "A" and sends it to "B".

S=D (ksA, M)

This transmission text is called a signature text and the operation of generating the signature sentence is called signature.

Step 2: "B" deciphers S by using the public key "kpA" of "A" to obtain the original plain text.

M=E (kpA, S)

If it is confirmed that M is a text having various meanings, it is certified that M has been transmitted from "A".

Since the public key of the transmitter "A" is made public, any person not limited to "B" can certify the signature text of "A".

Such certification is also called digital signature.

Certification communications with signature of a communication text (plain text) from "A" to "B" is performed by the following procedure.

Step 1: "A" generates a signature text S through signature of S by using the secret key "ksA" of "A".

S=D (ksA, M)

"A" further enciphers S by using the public key "kpB" of "B" and sends the enciphered text C to "B".

C=E (kpB, S)

Step 2: "B" deciphers C by using the secret key "ksB" of "B" to obtain a signature text S.

S=D (ksB, C)

"B" further deciphers S by using the public key "kpA" of "A" to obtain the original plain text M.

MzE (kpA, S)

If it is confirmed that M is a text having some meanings, it is certified that M has been transmitted from "A".

The sequence order of the functions at each Step of the secret communications with signature may be reversed. Specifically, Step 1: C=E (kpB, D (ksA, M)) and Step 2: M=E (kpA, D (ks8, C)) may be reversed to Step 1: C=D (ksA, E (kpB, M)) and Step 2: M=D (ksB, E (kpA, C)).

(c) Typical public key cryptosystems.

Typical examples of public key cryptosystems are enumerated in the following.

Cryptosystems capable of secret communications and certification communications are as follows (all of the foregoing and following publications are incorporated herein by reference).

RSA cryptosystem: R. L. Rivest, A. Shamir and I. Adleman, "A method of obtaining digital signatures and public key cryptosystems", Comm. of ACM, 1978.

R cryptosystem: M. Rabin, "Digitalized signatures and public-key cryptosystems", MIT/LCS/TR-212, Technical Report MIT. 1979.

W cryptosystem: H. C. Williams, "A modification of the RSA public-key encryption procedure", IEEE Trans. Inf. Theory, IT-26, 6, 1980.

MI cryptosystem: T. Matsumoto and H. Imai, "New algorithm for public-key cryptosystems", Technical Report, IT-82–84, 1982, IEICE; and T. Matsumoto and H. Imai, "A class of asymmetric cryptosystems based on polynomials over finite rings", IEEE International Symp. on Information Theory, 1983.

Cryptosystems capable of only secret communications are as follows:

MH cryptosystem: R. C. Merkle and M. E. Hellman, "Hiding information and signatures in trapdoor knapsacks", IEEE Trans. Inf. Theory, IT-24, 5, 1978.

GS cryptosystem: A. Shamir and R. E. Zippel, "On the security of the Merkle-Hellman cryptographic scheme", IEEE Trans. Inf. Theory, IT-26, 3, 1980.

CR cryptosystem: B. Chor and R. L. Rivest, "A knapsack type public key cryptosystem based on arithmetic infinite field", Proc. Crypto. 84.

M cryptosystem: R. J. McElioce, "A public-key cryptosystem based on algebraic coding theory", DSN Progress Rep. Jet Propulsion Lab. 1978.

E cryptosystem: T. E. Eicamal, "A public key cryptosystem and a signature scheme based on discrete logarithm", Proc. Crypto. 84, 1984.

T cryptosystem: Shigeo Tsujii, "A public key cryptosystem using matrix factorization", Technical Report, IEICE, IT8512, 1985.

Cryptosystems capable of only certification communications are as follows:

S cryptosystem: A. Shamir, "A fast signature scheme", report MIT/LCS/TM-107, MIT laboratory for computer science Cambridge, Mass. 1978.

L cryptosystem: K. Leiberherr, "Uniform complexity and digital signature", Lecture Notes in Computer Science 115 Automata Language and Programming, Eighth Colloquium Acre, Israel, 1981.

GMY cryptosystem: S. Goldwasser, S. Micali and A. Yao, "Strong signature schemes", ACM Symp. on Theory of Computing 1983.

GMR cryptosystem: S. Goldwasser, S. Micali and R. L. Rivest, "A paradoxical solution to the signature problem", ACM Symp. on Foundation of Computer Science, 1984.

OSS cryptosystem: H. Ong, C. P. Schnorr and A. Shamir, "An efficient signature scheme based on quadratic equation", ACM Symp. on Theory of Computing, OS cryptosystem: T. Okamoto and A. Shiraishi et al., "Signature scheme based on polynomials calculation", IEICE, (D), J86-D, 5, 1985; and T. Noto and A. Shiraishi, "A fast signature scheme based quadratic inequalities", IEEE Symp. on theory of Computing, 1984.

The Fifth Embodiment

This embodiment relates to a new accounting system in which charges of use depend on the image quality of the provided image. In this embodiment, that is, the image quality depends on the number of frames per predetermined time period, the number of pixels per image, the number of colors in the image, the clearness or brightness of each color, the dynamic range of resolution, etc. In this embodiment, such image quality is used for the datum TID.

This image quality is not specific to the particular image, because the image quality is changed based on the traffic on the communication line, the capability of the user's monitor or a precise data search, or the like. Therefore, in this embodiment, the image quality and a charge corresponding to each available image quality are presented as the datum TID. For example, a charge for high quality image differs from a charge for low quality image.

Again, it is within the scope of the invention for the information provider to transmit the image with the highest available quality, leaving it to the terminal to extract image data of the desired quality in accordance with the datum TID, or alternatively to send the image with the desired quality.

Figure 10:
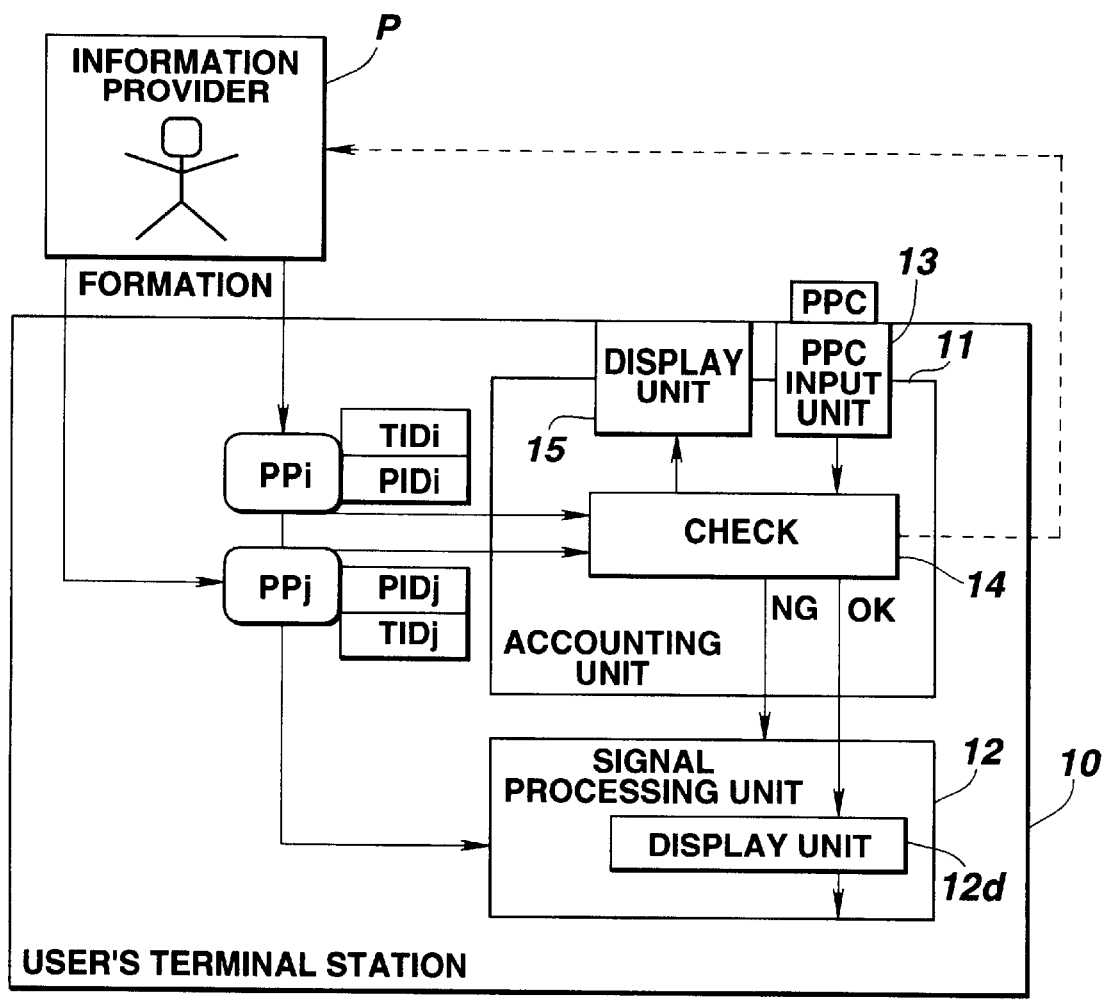
FIG. 10 is a block diagram showing an accounting apparatus and an accounting system according to the fifth embodiment of the invention.

Next, the operation of this embodiment will be described with reference to FIG. 10. Again, since that operation is largely similar to that of previous embodiments, it will be described only as to differences.

When use of PPC is permitted by the discrimination unit 14, an image quality datum TID with information PP is sent to a display unit 12d in signal processor 12. The unit 12d processes and displays or prints the information PP based on the image quality datum TID.

If the information PP includes the highest quality information and a user or the terminal device such as the monitor designates the quality, the display unit processes the information PP in accordance with the designated quality.

In this embodiment, software for processing the information PP (in whatever fashion) may be supplied to the user with the information PP by the information provider, network provider, or software developer. In this case, again, a suitable additional charge is levied, e.g., by means of an additional charge datum besides PID and TID.

In this embodiment, also, the network provider may give a processing service or a printing service for the user. In this case, the network provider adds the datum TID to the information PP and sends TID to the user with processed information.

Some institutions such as an information providing center, may provide the information PP, in this case, the institution processes the information PP according to the designated quality by user and adds the TID to the processed information PP.

Thus, new accounting systems related to features such as use of network and terminal, data compression, encryption, and image quality are described in the above-mentioned embodiments. Furthermore, this invention can be applied to other types of system, in which the above features are mixed and used by the above mentioned TID.

Also, this invention can be adapted to several kinds of processing, besides the above-mentioned types of processing, by including the kind of processing in the datum TID, or by providing such data in addition to TID and PID. Therefore, under the network situation to which this invention is applicable, several kinds of provider, such as an information provider, a terminal provider, and a software provider, will be able to use the network and will be correctly paid their charges from the user.

Also, in this invention, the TID may be sent to a user independently, without the requested information PP, as a way of notifying the user of the charge. (In this case, TID could include the total charge.) Then, if the money information stored in the PPC is larger than the charge shown in the TID, the information PP will be sent to the user, and the charge corresponding to the use may be paid.

Furthermore, the first datum PID may also be sent to a user independently. Hence, transmitting efficiency will be improved.

Also, in each of the above-described embodiments, a "free of charge" designation is included as a possible value of the charge communicated by either of the mentioned data PID and TID. Therefore, for example, a low resolution image or a low quality image, etc., may be offered free, for advertisement.

The Sixth Embodiment

Figure 11:
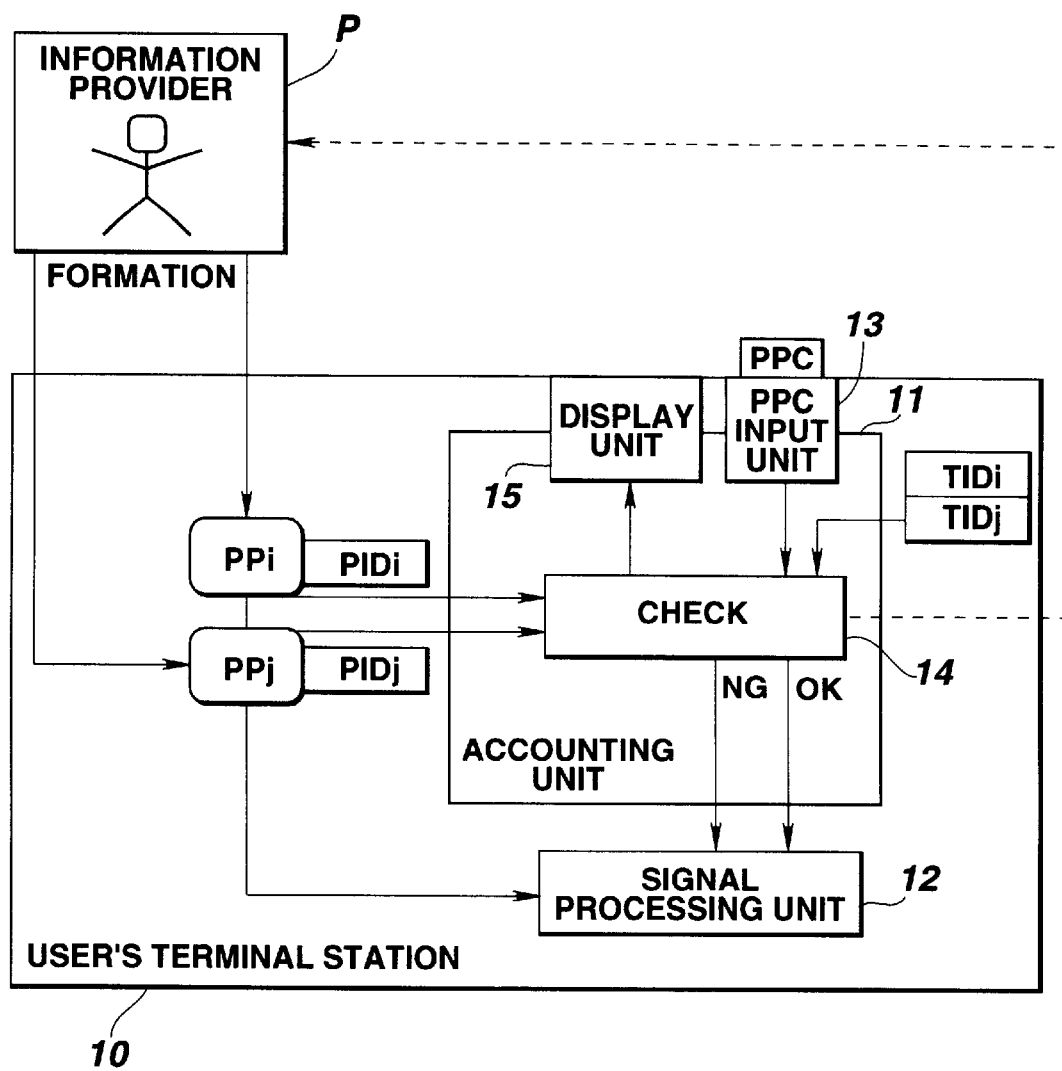
FIG. 11 is a block diagram showing an accounting apparatus and an accounting system according to the sixth embodiment of the invention.

If the TID is a datum specific to the particular terminal in question, such TID may be stored in the terminal 10, as shown in FIG. 11. In such case, several such data may be stored, for use according to circumstances. For example, one such datum may be used if the user only wishes to display the ordered information PP, while another datum is used if the user wishes to print the information.

The Seventh Embodiment

Figure 12:
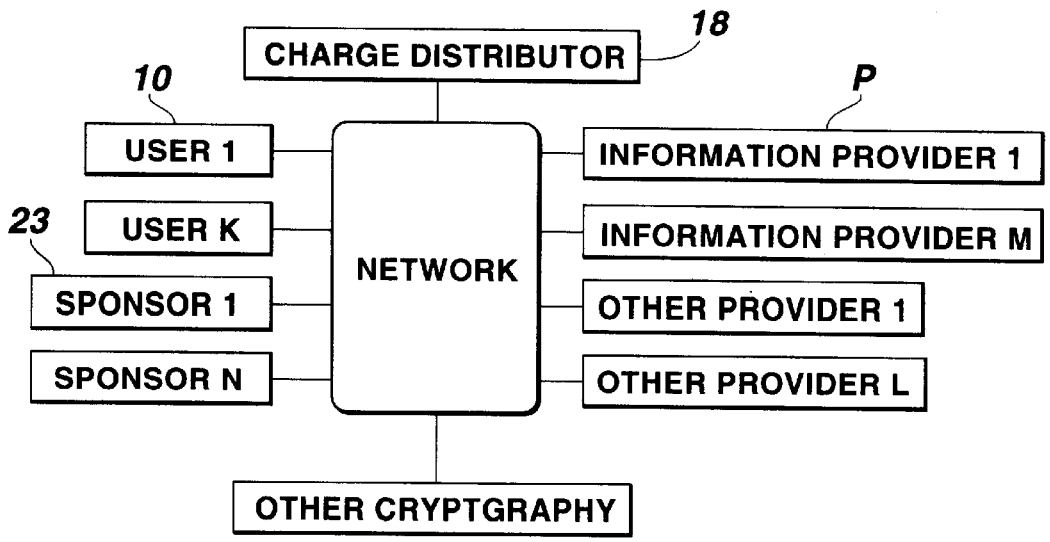
FIG. 12 is a block diagram showing an accounting system according to the seventh embodiment of the invention.

In the previous embodiments, only the user pays charges, based on the use of information and the network. However, in this embodiment, shown in FIG. 12 and FIG. 13, not only the user but also a sponsor who supplies advertisements will pay a charge.

In this embodiment, the difference between an expense for producing information such as a TV program or a movie or computer software, and the expense collected from the sponsors 23 (see FIG. 12) is settled in the PID, TID as a charge to the user. Therefore, the information provider P will be able to produce the information regardless of the money received from the sponsors 23, and the user will still be able to use the information at a low charge In this case, it is contemplated that the information PP will include advertisements. The user can select between high-quality information of high density (without advertisements) and inexpensive information with advertisements. In this case, the advertisement and the expense for information will be paid by the sponsors to the information provider P, and the information provider P charges the user for the use of the information based on the difference. The process of collecting the charge from the user is the same as above mentioned embodiments.

Next, the operation of this embodiment, insofar as it differs from that of the preceding embodiments, will be described with reference to FIG. 13.

Figure 13:
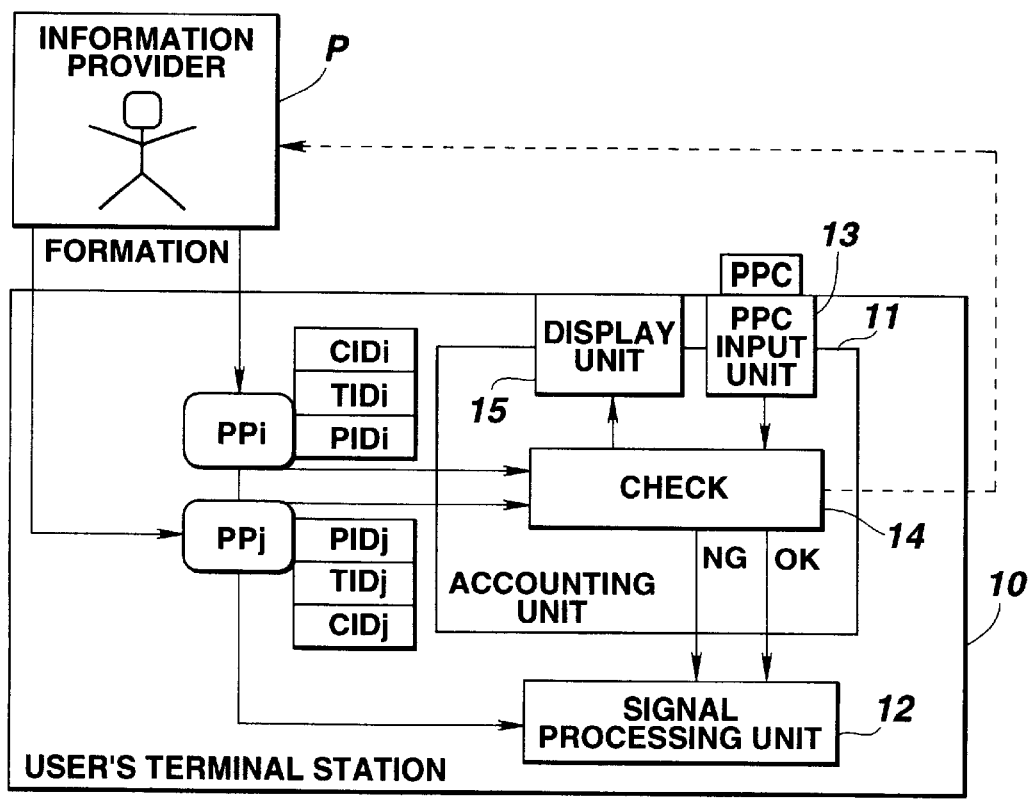
FIG. 13 is a block diagram showing an accounting apparatus and an accounting system according to the eighth embodiment of the invention.

In FIG. 13, $CID_i$ is data regarding the use of an advertisement settled by the sponsor, and, like TID, is not data specific to the information PP. Unlike TID and PID, however, the value represented by CID is not subtrated from PPC, but is added to PPC (this can also be viewed of course as CID being subtracted from TID+PID). That is, CID represents an amount paid by a sponsor, which accordingly the user does not have to pay. In return for this reduction in cost, the user receives advertisements (for example) with the ordered information PP. Otherwise, the operation of this embodiment is largely like that of the preceding embodiments.

Thus, in this embodiment, the discrimination unit 14 judges whether the money PPC recorded in the pre-paid card is larger than the charge (PIC+TID−CID). If it is larger, and if the accounting unit 11 can claim payment from the PPC, the use of PP is permitted. In this example, the use charge is displayed on the display unit 15.

The CID can be increased based on the frequency of use.

In the accounting system of this embodiment, the sponsor will pay a charge when a user uses the advertisement with ordered information: the sponsor will pay a greater charge in the case of information PP which is used frequently, and a lower charge for the information PP which is not used frequently.

The process for adding an advertisement to the information PP is as follows.

First, a user requests information PP, having elected to pay a lower price and to accept advertisement with the ordered information. The information provider P sends the information PP via the sponsor to the user, and the sponsor adds its own advertisement and the CID to the information PP. If on the other hand the user requests the information PP without any advertisements, the information is sent to the user directly from the information provider P.

Alternatively, the sponsor asks to add its advertisement directly to the information PP, so that the information provider can send the information PP, with or without advertisement, directly to the user.

The Eighth Embodiment

In the next embodiment, the charge related to TID, PID, CID depends on the frequency of use, such as a number of uses, or use time.

The operation will be described with reference to FIG. 14.

Figure 14:
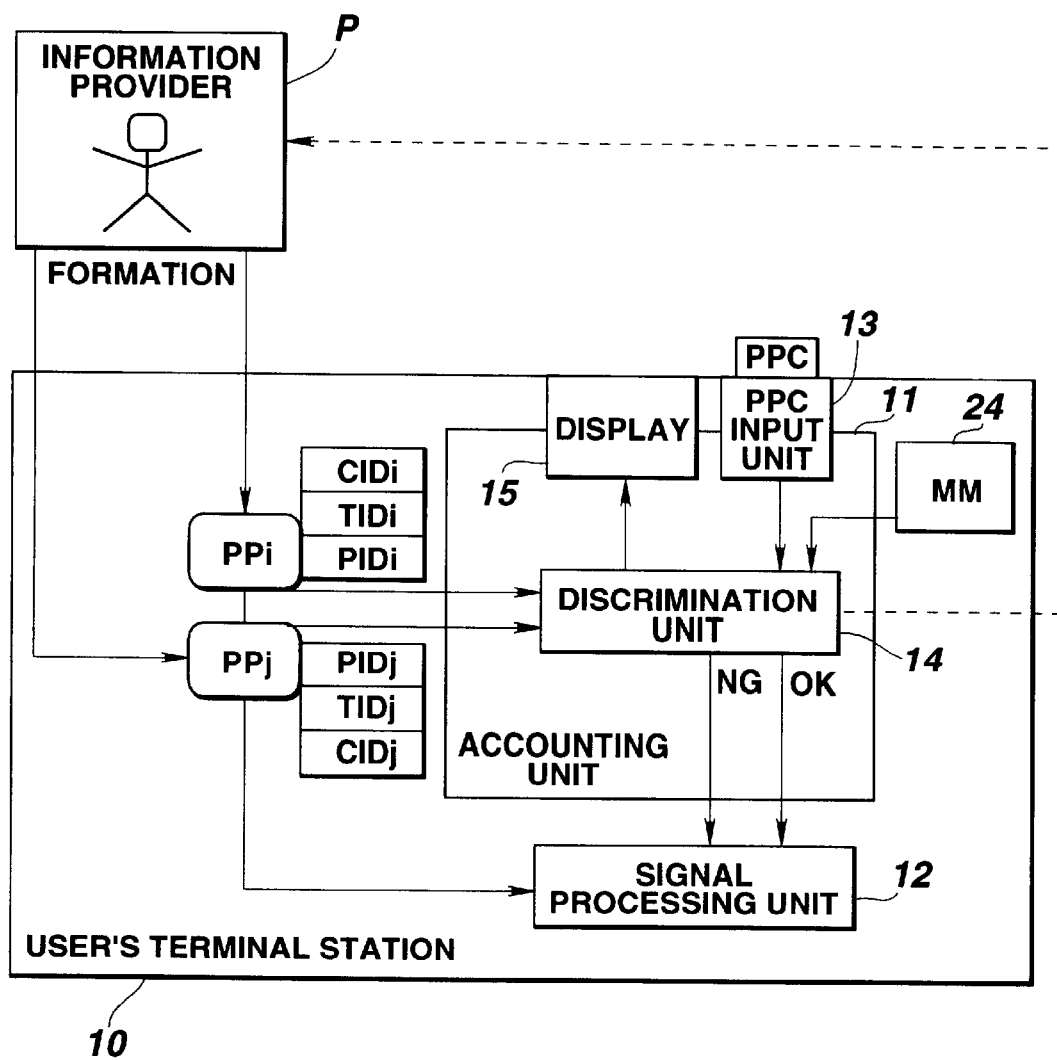
FIG. 14 is a block diagram showing an accounting apparatus and an accounting system according to the eighth embodiment of the invention.

In FIG. 14, reference numeral 24 is a memory unit which stores the frequency of use, such as a number of uses. The memory unit 24 is not accessible, except to the owner of the terminal (to protect the user's privacy).

In this embodiment, PPC is a pre-paid card such as a telephone card. A user inserts the pre-paid card into the money input 13. The accounting unit 11 reads money information from the PPC and the number of uses from the memory unit 24. The discrimination unit 14 judges whether or not the money recorded in the pre-paid card is larger than the charge (PID+TID−CID). If it is larger, and if the accounting unit 11 can claim payment from the PPC, use of the information PP is permitted by the discrimination unit 14. In this example, the use charge is displayed on the display unit 15.

After that, the frequency (contents of memory 24) will be updated to take account of the most recent use. More specifically, if the ordered informatoin PP is, say, a movie two hours long, and the terminal 10 measures only one hour of use of that information, the user is able to access that same body of information again for up to another hour, at no extra charge. Alternatively, the information provider may permit a user who has ordered the informaiotn PP to access it a specified number of times, say up to five, with a reduced charge for the second through fifth accesses. In such case, memory 24 keeps track of the five accesses. Thus, a user can more conveniently watch a long movie, or can load a complicated package of software in installments.

As described so far, according to the present invention, an accounting apparatus and an accounting system solving the above conventional problems (1) to (4) of multi-media networks can be realized.

Each user can rent at low cost a variety of information while protecting privacy. Not only an information provider but also the other provider can receive charges in accordance with a user frequency of provided information or network or terminal device, etc. without the management of use of provided information of each user by the information provider. By incorporating a charge distributor including retail shows and a charge accommodating person, an accounting system with charge payment function which is easy to use can be configured.

Many widely different embodiments of the present invention may be constructed without departing from the spirit and scope of the present invention. It should be understood that the present invention is not limited to the specific embodiments described in the specification, except as defined in the appended claims.

What is claimed is:

1. An accounting apparatus, comprising:
   (a) a money input, by means of which a user can input a credit value into said accounting apparatus;
   (b) a receiver for receiving a body of information and corresponding money information, the money information being fee information related to a content of the body of information;
   (c) a register arranged to store at least additional information that is irrelevant to the body of information; and
   (d) a controller for performing a predetermined algorithm based on the additional information and the money information to generate a resultant value, and for comparing the credit value input by the user via said money input to the resultant value generated by the algorithm to determine whether or not the user is permitted to access the body of information.

2. An apparatus according to claim 1, further comprising an indicator for indicating to the user whether or not the user is permitted to access the body of information, based on a result of processing provided by said controller.

3. An apparatus according to claim 1, wherein said money input is structured to receive cash representing the credit value.

4. An apparatus according to claim 1, wherein said money input is structured to accommodate an insertable recording medium and to read the credit value from the recording medium.

5. An accounting apparatus, comprising:
   (a) an information processor; and
   (b) means for performing a predetermined algorithm to generate a resultant value, and for determining whether a body of information is permitted to be processed by said information processor, by comparing a credit value provided to said accounting apparatus with the resultant value,
   wherein the predetermined algorithm is based on additional information that is irrelevant to the body of information and money information that is fee information related to a content of the body of information.

6. An apparatus according to claim 5, wherein at least a portion of the additional information relates to a usage of a communication line.

7. An apparatus according to claim 5, wherein at least a portion of the additional information relates to a usage of a terminal device.

8. An apparatus according to claim 5, wherein at least a portion of the additional information relates to a resolution at which the body of information was transmitted to said accounting apparatus, the body of information including hierarchically encoded data.

9. An apparatus according to claim 5, wherein the body of information is MPEG data, and wherein at least a portion of the additional information relates to a picture-type of the MPEG data.

10. An apparatus according to claim 5, wherein at least a portion of the additional information relates to security.

11. An apparatus according to claim 5, wherein at least a portion of the additional information relates to a processing speed for encryption or security verification.

12. An apparatus according to claim 5, wherein at least a portion of the additional information relates to a kind of encryption.

13. An apparatus according to claim 5, wherein at least a portion of the additional information relates to a quality of an image.

14. An apparatus according to claim 5, wherein at least a portion of the additional information relates to a speed of processing.

15. An apparatus according to claim 5, wherein it least a portion of the additional information relates to a kind of processing.

16. An apparatus to claim 5, wherein at least a portion of the additional information relates to an advertisement by a sponsor.

17. A communication system comprising:
   (a) an information provider, which provides a body of information and corresponding money information relating to a content of the body of information;
   (b) a service provider, which provides a service relating to handling of the body of information provided by said information provider, said service provider adding additional information that is delivered with the body of information and the money information to a user, the additional information being irrelevant to the body of information; and
   (c) a charge distributor, which collects charges relating to provision of the body of information to the user by said information provider and to the service provided by said service provider, based on the money information and the additional information, respectively, said charge distributor performing at least one predetermined formula based on the money information and the additional information for determining an allocation of the charges to said information provider and said service provider, and for distributing respectively allocated portions of the charges to said information provider and said service provider based on the additional information.

18. A communication system according to claim 17, further comprising a network connecting said information provider, said service provider, and said charge distributor.

19. A communication system according to claim 17, further comprising:
   (d) an accounting unit, which determines whether the user is permitted to access the body of information, based on the money information and the additional information.

20. A communication system according to claim 17, wherein the body of information comprises image data.

21. A communication system according to claim 20, wherein the image data is compressed using a MPEG method.

22. A communication system according to claim 17, wherein the body of information comprises a computer software program.

23. A communication system according to claim 17, wherein the money information relates to a charge for using the body of information.

24. A communication system according to claim 17, wherein the additional information relates to a charge for the service.

25. A communication system according to claim 17, wherein the service comprises delivering the body of information to the user via a network.

26. A communication system according to claim 17, wherein the service comprises processing the body of information.

27. An apparatus according to claim 1, wherein at least a portion of the additional information relates to a usage of a communication line.

28. An apparatus according to claim 1, wherein at least a portion of the additional information relates to a usage of a terminal device.

29. An apparatus according to claim 1, wherein at least a portion of the additional information relates to a resolution at which the body of information was transmitted to said accounting apparatus, the body of information including hierarchically encoded data.

30. An apparatus according to claim 1, wherein the body of information includes MPEG data, and wherein at least a portion of the additional information relates to a picture-type of the MPEG data.

31. An apparatus according to claim 1, wherein at least a portion of the additional information relates to security.

32. An apparatus according to claim 1, wherein at least a portion of the additional information relates to a processing speed for encryption or security verification.

33. An apparatus according to claim 1, wherein at least a portion of the additional information relates to a kind of encryption.

34. An apparatus according to claim 1, wherein at least a portion of the additional information relates to a quality of an image.

35. An apparatus according to claim 1, wherein at least a portion of the additional information relates to a speed of processing.

36. An apparatus according to claim 1, wherein at least a portion of the additional information relates to a kind of processing.

37. An apparatus according to claim 1, wherein at least a portion of the additional information relates to an advertisement by a sponsor.

* * * * *

UNITED STATES PATENT AND TRADEMARK OFFICE
CERTIFICATE OF CORRECTION

PATENT NO. : 6,272,535 B1
DATED : August 7, 2001
INVENTOR(S) : Iwamura

It is certified that error appears in the above-identified patent and that said Letters Patent is hereby corrected as shown below:

Title page,
In the illustrative Fig., "COMMUNITIONS" should read -- COMMUNICATIONS --.
Item [56], References Cited, U.S. PATENT DOCUMENTS, insert
-- 4,751,732   6/1998  Kamitake     380/20; and
4,827,508     3/1991  Shear        380/4 --.

Item [56], References Cited, FOREIGN PATENT DOCUMENTS, "244447" should read -- 2-44447 -- and "464129" should read -- 4-64129 --.

Drawings,
Sheet 2, Fig. 2, "ACCOMDATOR" should read -- ACCOMODATOR --.
Sheet 3, Fig. 3, "COMMUNITIONS" should read -- COMMUNICATIONS --.
Sheet 4, Fig. 4, "BEGGINNING" should read -- BEGINNING --.
Sheet 7, Fig. 8, "CRYPTGRAPHY" should read -- CRYPTOGRAPHY --.
Sheet 8, Fig., 9, "CRYPTGRAPHY" should read -- CRYPTOGRAPHY --.
Sheet 10, Fig. 12, "CRYPTGRAPHY" should read -- CRYPTOGRAPHY --.

Column 5,
Line 3, "accommodater" should read -- accommodator --;
Line 17, "informaiton" should read -- information --;
Line 25, "be by" should read -- be done by --; and
Line 35, "hte" should read -- the --.

Column 6,
Line 31, "out-let" should read -- outlet --;
Line 59, "anmount" should read -- amount --; and
Line 65, "and" should read -- and --.

Column 7,
Line 19, "use" should read -- use of --; and
Line 34, "following" should read -- the following --.

Column 8,
Line 20, "massage" should read -- message --.

UNITED STATES PATENT AND TRADEMARK OFFICE
CERTIFICATE OF CORRECTION

PATENT NO. : 6,272,535 B1
DATED : August 7, 2001
INVENTOR(S) : Iwamura

It is certified that error appears in the above-identified patent and that said Letters Patent is hereby corrected as shown below:

Column 10,
Line 10, "IN" should read -- in --;
Line 36, "hierarchial" should read -- hierarchical --; and
Line 50, "T81," should read -- T.81, --.

Column 11,
Line 2, "altervatively" should read -- alternatively --;
Line 34, "distributer" should read -- distributor --; and
Line 42, "distributer" should read -- distributor --.

Column 13,
Line 2, "B-picture" should read -- B-pictures --; and
Line 10, "nexst" should read -- next --.

Column 14,
Line 19, "I-frame," should read -- I-frames, --;
Line 39, "the" (second occurrence) should be deleted; and
Line 59, "informaiton" should read -- information --.

Column 15,
Line 55, "envrypted" should read -- encrypted --; and
Line 59, "informaiton" should read -- information --.

Column 16,
Line 3, "informatoin" should read -- information --; and
Line 13, "IN" should read -- In --.

Column 19,
Line 44, "Computing," should read -- Computing. -- and begin a new paragraph at "OS"; and
Line 48, "based" should read -- based on --.

UNITED STATES PATENT AND TRADEMARK OFFICE
CERTIFICATE OF CORRECTION

PATENT NO. : 6,272,535 B1
DATED : August 7, 2001
INVENTOR(S) : Iwamura

It is certified that error appears in the above-identified patent and that said Letters Patent is hereby corrected as shown below:

Column 20,
Line 32, "PP, in" should read -- PP. In --.

Column 21,
Line 24, "charge" should read -- charge. --; and
Line 40, "subtrated" should read -- subtracted --.

Column 22,
Line 35, "informatoin" should read -- information --; and
Line 40, "informaiotn" should read -- information --.

Signed and Sealed this

Thirtieth Day of July, 2002

*Attest:*

JAMES E. ROGAN
*Attesting Officer*  *Director of the United States Patent and Trademark Office*